United States Patent
Trenkle et al.

(10) Patent No.: US 12,353,424 B2
(45) Date of Patent: Jul. 8, 2025

(54) INTUITIVE CONTENT SEARCH RESULTS SUGGESTION SYSTEM

(71) Applicant: Tubi, Inc., San Francisco, CA (US)

(72) Inventors: John Trenkle, Albany, CA (US); Snehal Mistry, Fairfield, CA (US); Qiang Chen, Beijing (CN); Chang She, San Francisco, CA (US); Rameen Mahdavi, San Francisco, CA (US); Marios Assiotis, San Francisco, CA (US)

(73) Assignee: Tubi, Inc., San Francisco, CA (US)

( * ) Notice: Subject to any disclaimer, the term of this patent is extended or adjusted under 35 U.S.C. 154(b) by 0 days.

(21) Appl. No.: 16/935,187

(22) Filed: Jul. 21, 2020

(65) Prior Publication Data

US 2022/0027373 A1 Jan. 27, 2022

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06F 16/26* (2019.01); *G06F 16/288* (2019.01); *G06N 3/045* (2023.01)

(58) Field of Classification Search
CPC .. G06F 16/24578; G06F 16/26; G06F 16/288; G06F 16/248; G06F 17/16;
(Continued)

(56) References Cited

U.S. PATENT DOCUMENTS 8,776,111 B1 7/2014 Eldering et al.
9,215,123 B1 12/2015 Fears et al.
(Continued)

FOREIGN PATENT DOCUMENTS

CN 110769288 A 2/2020
CN 110837578 B 5/2021
(Continued)

OTHER PUBLICATIONS

Deldjoo. "Movie genome: alleviating new item cold start inmovie recommendation" 291-343.Springer Nature. Web. URL: https://link.springer.com/article/10.1007/s 11257-019-09221-y. Feb. 26, 2019; Entire Document.
(Continued)

*Primary Examiner* — Jensen Hu
(74) *Attorney, Agent, or Firm* — Redbrick IP, P.C.

(57) ABSTRACT

System and methods for intuitive search operation results using machine learning including: identifying a first candidate content item matching a content item search request; identifying a first content item model corresponding to the first candidate content item including word vector collaborative filtering representations of the first candidate content item; identifying a set of content item models where each: is associated with at least one corresponding available content item, and includes word vector collaborative filtering representations; applying deep neural learning to compare the first content item model with the set of content item models to generate a subset of the content item models most relevant to the first content item model; generating a result set of available content items corresponding to the subset of the content item models most relevant to the first content item model; and providing the result set of available content items.

17 Claims, 13 Drawing Sheets

(51) Int. Cl.
  *G06F 16/26* (2019.01)
  *G06F 16/28* (2019.01)
  *G06N 3/045* (2023.01)
(58) Field of Classification Search
  CPC ........ G06N 3/0454; G06N 20/00; G06N 3/08; G06N 3/045
  See application file for complete search history.

(56) References Cited

U.S. PATENT DOCUMENTS

| | | | |
|---|---|---|---|
| 9,230,212 | B2 * | 1/2016 | Su .................... G06N 20/00 |
| 9,277,275 | B1 | 3/2016 | Arini |
| 9,465,604 | B1 | 10/2016 | Burgyan et al. |
| 9,563,928 | B1 | 2/2017 | Sokolowski et al. |
| 11,004,135 | B1 | 5/2021 | Sandler |
| 2001/0020255 | A1 | 9/2001 | Hofmann et al. |
| 2002/0129368 | A1 | 9/2002 | Schlack et al. |
| 2002/0178126 | A1 | 11/2002 | Beck et al. |
| 2003/0235184 | A1 | 12/2003 | Dorenbosch et al. |
| 2005/0101321 | A1 | 5/2005 | Ikeda et al. |
| 2005/0177835 | A1 | 8/2005 | Chickering |
| 2006/0075019 | A1 | 4/2006 | Donovan et al. |
| 2006/0253323 | A1 | 11/2006 | Phan et al. |
| 2007/0233671 | A1 | 10/2007 | Oztekin et al. |
| 2008/0082604 | A1 | 4/2008 | Mansour et al. |
| 2008/0259906 | A1 | 10/2008 | Shkedi |
| 2009/0006214 | A1 | 1/2009 | Lerman |
| 2009/0064301 | A1 | 3/2009 | Sachdeva |
| 2009/0089161 | A1 | 4/2009 | Alo et al. |
| 2009/0106785 | A1 | 4/2009 | Pham |
| 2009/0129479 | A1 | 5/2009 | Yellamraju |
| 2009/0204478 | A1 | 8/2009 | Kaib et al. |
| 2010/0151816 | A1 | 6/2010 | Besehanic et al. |
| 2010/0211967 | A1 | 8/2010 | Ramaswamy et al. |
| 2010/0246981 | A1 | 9/2010 | Hu et al. |
| 2011/0040636 | A1 | 2/2011 | Simmons et al. |
| 2011/0093335 | A1 | 4/2011 | Fordyce et al. |
| 2011/0103374 | A1 | 5/2011 | LaJoie et al. |
| 2011/0113116 | A1 | 5/2011 | Burdette et al. |
| 2011/0125594 | A1 | 5/2011 | Brown et al. |
| 2011/0167440 | A1 | 7/2011 | Greenfield |
| 2011/0219229 | A1 | 9/2011 | Cholas et al. |
| 2011/0246298 | A1 | 10/2011 | Williams et al. |
| 2011/0252305 | A1 | 10/2011 | Tschani et al. |
| 2011/0258049 | A1 | 10/2011 | Ramer et al. |
| 2012/0007866 | A1 | 1/2012 | Tahan |
| 2012/0016655 | A1 | 1/2012 | Travieso |
| 2012/0029983 | A1 | 2/2012 | Rodriguez et al. |
| 2012/0089455 | A1 | 4/2012 | Belani et al. |
| 2012/0102169 | A1 | 4/2012 | Yu et al. |
| 2012/0151079 | A1 | 6/2012 | Besehanic et al. |
| 2013/0110634 | A1 | 5/2013 | Cochran et al. |
| 2013/0132856 | A1 | 5/2013 | Binyamin et al. |
| 2013/0156269 | A1 | 6/2013 | Matsui et al. |
| 2013/0198376 | A1 | 8/2013 | Anda et al. |
| 2013/0268951 | A1 | 10/2013 | Wyatt et al. |
| 2013/0311649 | A1 | 11/2013 | DeFrancesco et al. |
| 2013/0346202 | A1 | 12/2013 | Kouladjie |
| 2014/0075014 | A1 | 3/2014 | Chourey |
| 2014/0101739 | A1 | 4/2014 | Li et al. |
| 2014/0143052 | A1 | 5/2014 | Stryker |
| 2014/0157289 | A1 | 6/2014 | Aarts et al. |
| 2014/0181121 | A1 | 6/2014 | Nice |
| 2014/0181243 | A1 | 6/2014 | Nieuwenhuys |
| 2014/0282642 | A1 | 9/2014 | Needham et al. |
| 2014/0372415 | A1 | 12/2014 | Fernandez-Ruiz |
| 2014/0379911 | A1 | 12/2014 | Fayssal et al. |
| 2015/0206198 | A1 | 7/2015 | Marshall |
| 2015/0234564 | A1 | 8/2015 | Snibbe et al. |
| 2015/0271540 | A1 | 9/2015 | Melby et al. |
| 2015/0382075 | A1 | 12/2015 | Neumeier et al. |
| 2016/0358209 | A1 | 12/2016 | Khozani et al. |
| 2016/0360289 | A1 | 12/2016 | Santoro et al. |
| 2017/0064411 | A1 | 3/2017 | Goli et al. |
| 2017/0132510 | A1 * | 5/2017 | Paluri .................... H04L 67/10 |
| 2017/0171580 | A1 * | 6/2017 | Hirsch .................... H04L 67/62 |
| 2017/0193390 | A1 * | 7/2017 | Weston .................... G06N 3/08 |
| 2018/0121799 | A1 | 5/2018 | Hashimoto et al. |
| 2018/0189570 | A1 | 7/2018 | Paluri |
| 2019/0034976 | A1 | 1/2019 | HAmedi et al. |
| 2019/0065589 | A1 | 2/2019 | Wen et al. |
| 2020/0004886 | A1 * | 1/2020 | Ramanath ............ G06F 16/248 |
| 2020/0019561 | A1 * | 1/2020 | Doyle .................. G06F 16/287 |

FOREIGN PATENT DOCUMENTS

| | | | |
|---|---|---|---|
| WO | 2018148493 A1 | 8/2018 | |
| WO | WO-2018236732 A1 * | 12/2018 | ............ G06N 20/00 |
| WO | 2019231559 A1 | 12/2019 | |

OTHER PUBLICATIONS

International Search Report and Written Opinion received in PCT/US21/42452, mailed on Jan. 19, 2022 (14 pages).
Shankar et al. "Deep Learning based Large Scale Visual Recommendation and Search for E-Commerce." 1-9, 2017.

* cited by examiner

INTUITIVE CONTENT SEARCH RESULTS SUGGESTION SYSTEM

CROSS-REFERENCE TO RELATED APPLICATIONS

This application is related to, and herein incorporates by reference for all purposes, U.S. patent application Ser. No. 16/935,178, filed Jul. 21, 2020, entitled "CONTENT COLD-START MACHINE LEARNING SYSTEM", inventors John Trenkle, Snehal Mistry, Qiang Chen, Chang She, Rameen Mandavi, and Marios Assiotis.

BACKGROUND

Recent advancements in computing technology have led to a movement for creating internet-connected devices. Inexpensive hardware has contributed to a trend in which many more devices (e.g., smart TVs, smart phones, etc.) now include network connectivity.

As the number of network-connected devices has increased, so has the amount of content that may be distributed to these devices. For example, the production and availability of TV series, movies, and music, to name a few, has significantly increased in recent years. In response, content providers have struggled to evaluate, categorize, and organize vast libraries of content.

Meanwhile, each item of content includes evermore metadata, thereby geometrically increasing the amount of information about the content. Attempting to assimilate the intricate relationships between each content item and the myriad of content items in vast libraries is further complicated by this multitude of information. Even further, content providers now strive to reveal and understand the relationships between these content items more accurately and intelligently than ever before to in turn provide better consumer experiences.

SUMMARY

In general, in one aspect, embodiments relate to a system for intuitive search operation results using machine learning. The system can include: a computer processor; a content comprehension engine executing on the computer processor and configured to: receive a content item search request; identify a first candidate content item matching the content item search request; identify a first content item model corresponding to the first candidate content item, where the first content item model includes word vector collaborative filtering representations of the first candidate content item; identify a set of content item models, where each of the set of content item models: is associated with at least one corresponding available content item, and includes word vector collaborative filtering representations of the associated at least one corresponding available content item; apply deep neural learning to compare the first content item model with the set of content item models to generate a subset of the content item models most relevant to the first content item model; generate a result set of available content items corresponding to the subset of the content item models most relevant to the first content item model; and provide, in response to the content item search request, the result set of available content items.

In general, in one aspect, embodiments relate to a method for intuitive search operation results using machine learning. The method can include: receiving a content item search request; identifying a first candidate content item matching the content item search request; identifying, by at least one computer processor, a first content item model corresponding to the first candidate content item, where the first content item model includes word vector collaborative filtering representations of the first candidate content item; identifying a set of content item models, where each of the set of content item models: is associated with at least one corresponding available content item, and includes word vector collaborative filtering representations of the associated at least one corresponding available content item; applying deep neural learning to compare the first content item model with the set of content item models to generate a subset of the content item models most relevant to the first content item model; generating a result set of available content items corresponding to the subset of the content item models most relevant to the first content item model; and providing, in response to the content item search request, the result set of available content items.

In general, in one aspect, embodiments relate to a non-transitory computer-readable storage medium having instructions for intuitive search operation results using machine learning. The instructions are configured to execute on at least one computer processor to enable the computer processor to: receive a content item search request; identify a first candidate content item matching the content item search request; identify a first content item model corresponding to the first candidate content item, where the first content item model includes word vector collaborative filtering representations of the first candidate content item; identify a set of content item models, where each of the set of content item models: is associated with at least one corresponding available content item, and includes word vector collaborative filtering representations of the associated at least one corresponding available content item; apply deep neural learning to compare the first content item model with the set of content item models to generate a subset of the content item models most relevant to the first content item model; generate a result set of available content items corresponding to the subset of the content item models most relevant to the first content item model; and provide, in response to the content item search request, the result set of available content items.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1:
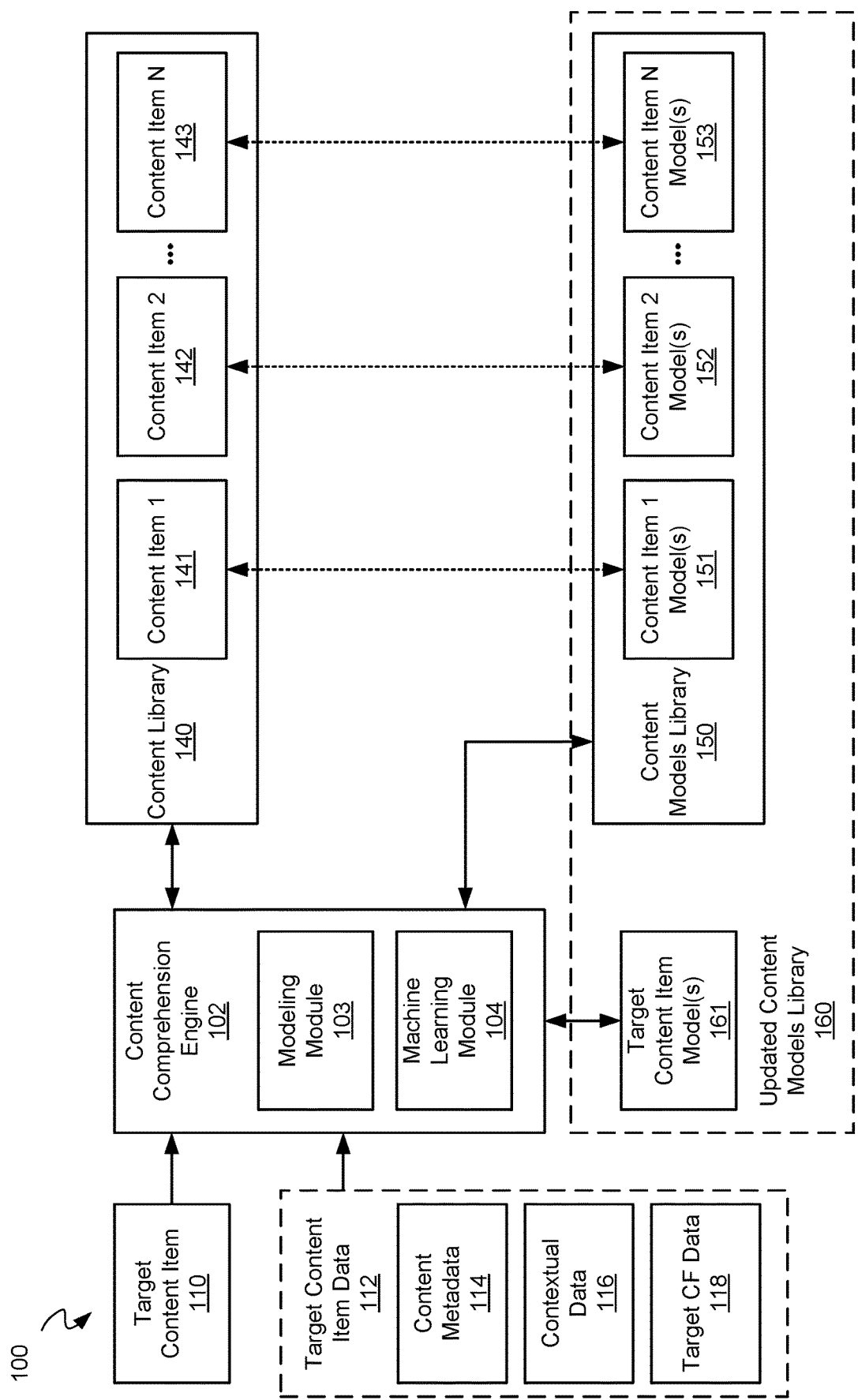
FIG. 1 illustrates a block diagram of a content modeling and comprehension system in accordance with one or more embodiments.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for generating models representing content items. The content item models may be generated based on any of the following vector representations known as embeddings: collaborative filtering data models, word vector representations, graph embeddings derived from hierarchical data, sense embeddings or other contextualized vector spaces. They may be generated by leveraging disparate types of content information (e.g., metadata, contextual data, knowledge graphs and/or other collaborative filtering data). Accordingly, the disparate types of content information may be "harmonized". Further, a computer can now "understand" or "comprehend" these content items using their collaborative filtering data models. As a result, machine learning can be applied to compare content items using their collaborative filtering data models, and thereby produce a variety of intuitive and complex analyses across massive data sets (e.g., thousands, millions, or more items). The methods and systems may apply deep neural learning, or machine learning, to perform the invention (e.g., generating models, comparing models, etc.).

Embodiments of the present disclosure provide methods and systems for generating content item cold-start characteristics. A new content item may be compared with known, existing, or currently available content items using their collaborative filtering data models to determine cold-start characteristics of the new content item. For example, determining cold-start characteristics based on similarity with other content items, or based on other analyses. As a result, a platform may introduce the new content item according to the cold-start characteristics. The methods and systems may apply deep neural learning, or machine learning, to perform the invention (e.g., generating cold-start characteristics, etc.).

Embodiments of the present disclosure provide methods and systems for generating intuitive search query results. When a search query is received, the collaborative filtering data models may be used to generate search results that are vastly improved over conventional search technologies (e.g., simple strict word matching). For example, the search results are more intelligent and actually relevant, and thereby seemingly "intuitive" to a search requester. The search results may be provided when the content item sought by the search requester is not in the search results (e.g., unavailable on the platform), and thereby the search results provide very relevant alternative content items. The methods and systems may apply deep neural learning, or machine learning, to perform the invention (e.g., generating intuitive search results, etc.).

FIG. 1 shows a content modeling and comprehension system 100 including a content comprehension engine 102 in accordance with one or more embodiments. As shown in FIG. 1, the content comprehension engine 102 may include one or more components, for example, a modeling module 103 and a machine learning module 104. In one or more embodiments, the system 100 analyzes various information about a content item to produce a model of the content item that may be used for evaluation with respect to models of other content items. The system 100 may be a, part of, or coupled with a platform (e.g., a content distribution platform).

In one or more embodiments, the content comprehension engine 102 includes functionality to identify a target content item to be modeled. For example, referring to FIG. 1, the content comprehension engine 102 may identify target content item 110. Alternatively, the content comprehension engine 102 may be directed to the target content item 110. In either case, the content comprehension engine 102 may access the target content item 110.

In one or more embodiments, the content comprehension engine 102 includes functionality to identify content metadata and contextual data both corresponding to the target content item. For example, the content comprehension engine 102 may identify and/or access the target content item data 112. In general, the target content item data 112 may include information about the target content item 110. For example, the target content item data 112 may include content metadata 114, contextual data 116, and/or collaborative filtering data 118.

The content metadata 114 may include metadata about the target content item 110. For example, in the case of a film, a cast list, film director, release year, corresponding genres, and so on. The contextual data 116 may include contextual data about the target content item 110. For example, still in the case of a film, plot description, critic reviews, award list, box office performance data, associated moods or sentiments, and so on. The collaborative filtering data 118 may include representations of the target content item 110 that may be in a preexisting modeled form, which will be further discussed.

In one or more embodiments, the content comprehension engine 102 includes functionality to generate a target content item model by applying deep neural learning to the content metadata and the contextual data. The deep neural learning may be performed by the modeling module 103 and/or the machine learning module 104. For example, the deep neural learning applies word vector embedding operations to the content metadata and to the contextual data to generate collaborative filtering representations of each.

In one or more embodiments, a collaborative filtering representation may be a form of data that bridges different types of representations of information into a common form, thereby allowing the different types of representations to ultimately "collaborate". In other words, a collaborative filtering representation may store data types that were once dissimilar, but later converted or translated into a common data space. For example, the content comprehension engine 102 may translate data (e.g., words, sentences, paragraphs, etc.) by applying word vector embedding operations.

Figure 3:
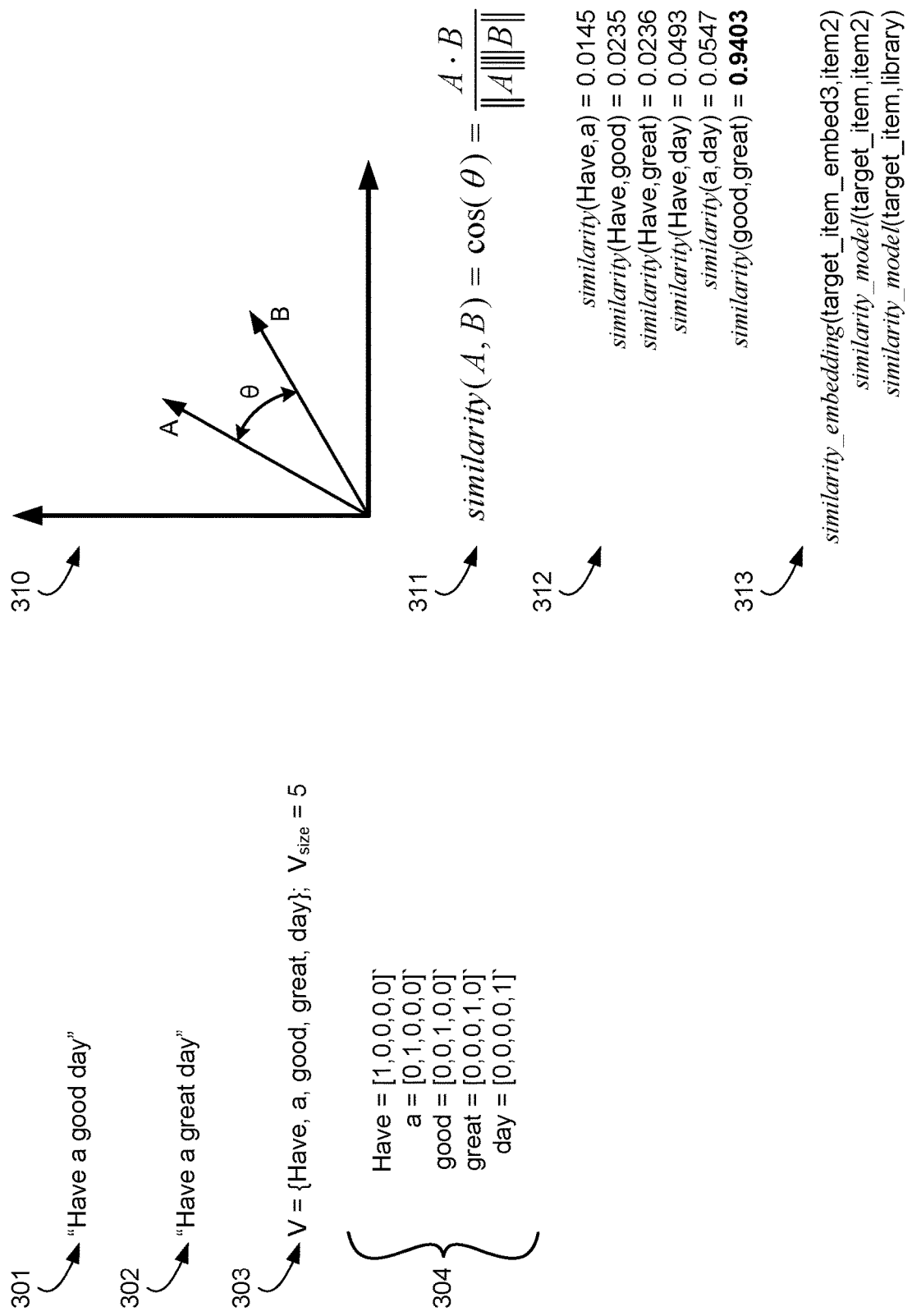
FIG. 3 illustrates word vector embedding principles in accordance with one or more embodiments.

For example, turning to FIG. 3, which demonstrates word vector embedding principles, a sentence 301 recites "Have a good day" and a sentence 302 recites "Have a great day". A human reader will understand that these sentences are similar but slightly different. However, a conventional computer would not be able to understand the sentences, let alone the nuanced difference between them.

To enable a computer to understand the sentences and the nuanced differences, word vectors may be used. A word vector is, for example, a representation of a word in vector format. For example, a word vector may include various numerical values that together characterize a word.

Continuing the example of the two sentences, to generate word vectors representing the words of the sentences and thereby the entire sentences, the deep neural learning may involve building a vocabulary set V 303 represented by {Have, a, good, great, day} with a size Vsize=5. The deep neural learning may include creating a "one-hot" word vector for each of the words in the vocabulary set V 303, each with a length Vsize=5. A "one-hot" vector is one in which the legal combinations of values are only those with a single high "1" bit and all other bits low "0". The high bit in each word vector would be located at a vector position representing the corresponding word in the vocabulary set V 303. Such a group of word vectors may be represented by the word vector set 304.

Accordingly, the word vector set 304 would represent a 5-dimensional space, where each word occupies one and only one of the dimensions, thereby having no projection along the other dimensions. However, this would mean that the words "good" and "great" are as different as "day" and "have", which is not true. For this reason, the deep neural learning may involve operations to cause the words with similar context to occupy closer spatial positions, thereby indicating their similarity to a machine.

Consider 2-dimensional graph 310, which depicts vector A, vector B, and an angle θ between them. Mathematically, the closer vector A and vector B are to one another, the cosine of the angle between vector A and vector B should be closer to 1 (i.e., angle θ closer to 0). In other words, the smaller the angle θ, the more similar vector A and vector B are, while the opposite is true. The similarity function 311 may be defined as similarity(A,B)=cosine(θ)=(A*B)(‖A‖‖B‖). It should be appreciated that while these concepts are discussed with respect to a 2-dimensional space, these concepts extend to multidimensional spaces.

Through machine learning, the content comprehension engine 102 may adjust the word vectors, or reinterpret the word vectors, such that the vectors for words with higher similarity are spatially more proximate. For example, as depicted by the examples 312 and as a result of the machine learning, the similarity function operating on the word vector representing the word "Have" (i.e., [1,0,0,0,0]) and the word "a" (i.e., [0,1,0,0,0]) may result in a value of 0.0145 or 1.45% similarity. However, the similarity function operating on the word vector representing the word "good" (i.e., [0,0,1,0,0]) and the word "great" (i.e., [0,0,0,1,0]) may result in a value of 0.9403 or 94.03% similarity.

As a result, the content comprehension engine 102 may be able to better "understand" the difference between the sentence 301 reciting "Have a good day" and the sentence 302 reciting "Have a great day". As well as the difference between those sentences and "Have a nice day", "Have a bad day", or "Have a great night", when machine learning a larger vocabulary set.

It should be understood that the word vector embedding principles discussed above are offered as one demonstration of how a machine may begin to "understand" or "comprehend" words, but that other machine learning techniques are possible. For example, there may be other operations aside from, or in combination with, the similarity function 311 that may be performed to characterize a word.

Returning to FIG. 1, the content comprehension engine 102 may perform deep neural learning that applies word vector embedding operations to the content metadata 114 and to the contextual data 116 to generate collaborative filtering representations of each. As discussed, a collaborative filtering representation may store data types that were once dissimilar, but later converted or translated into a common data space. Such a translation may be achieved with machine learning techniques similar to or consistent with those discussed herein. For example, applying word vector embedding may include applying an algorithm to the content metadata and the contextual data to generate at least one multidimensional vector representing the content metadata and at least one multidimensional vector representing the contextual data.

Figure 2:
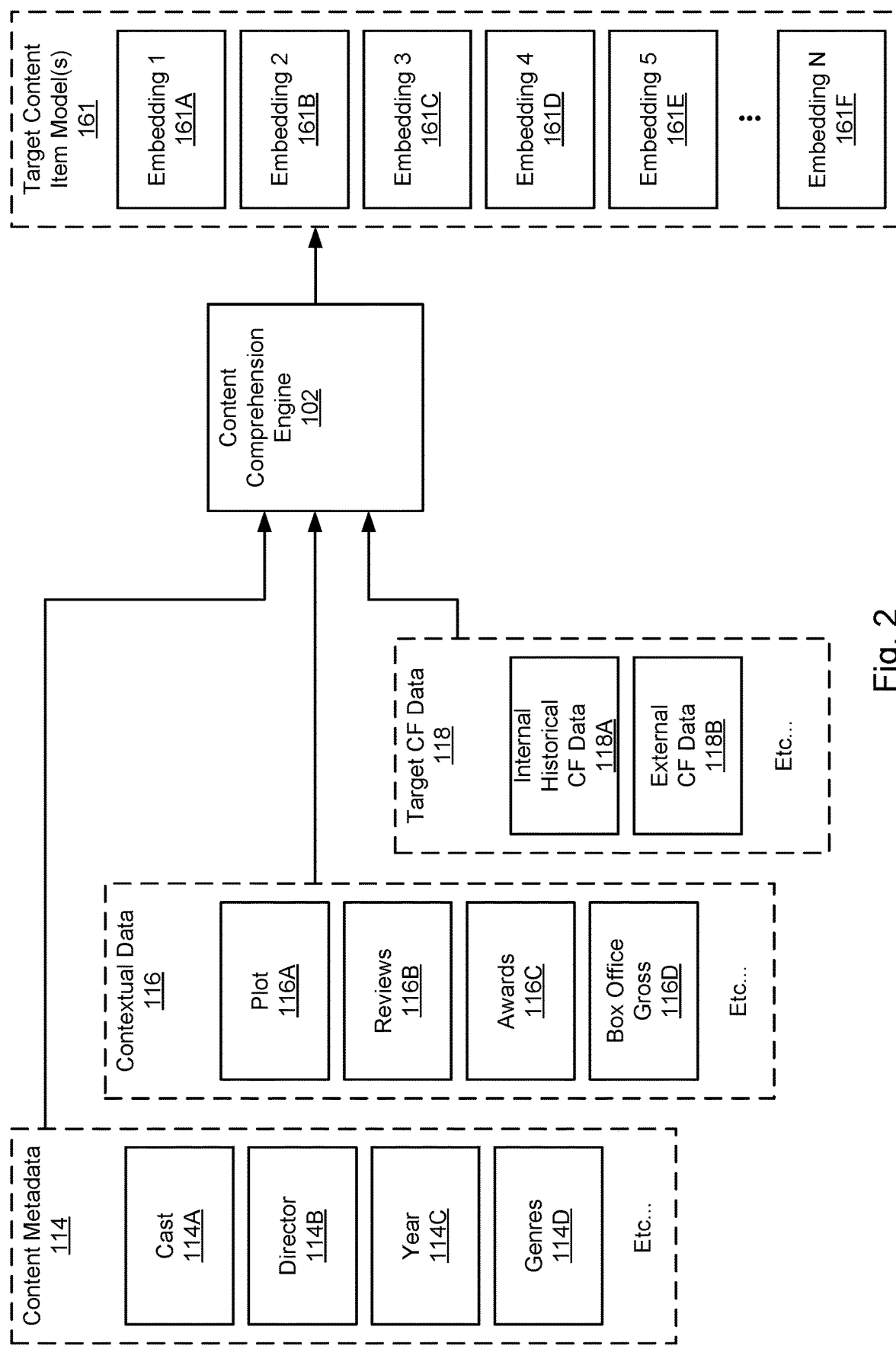
FIG. 2 illustrates a block diagram of a content modeling and comprehension system and various data types in accordance with one or more embodiments.

For example, turning to FIG. 2, the content metadata 114 and contextual data 116 are shown to include various types of information. For example, the content metadata 114 may include cast data 114A, director data 114B, year data 114C, genre data 114D, etc., while the contextual data 116 may include plot data 116A, reviews data 116B, awards data 116C, box office gross data 116D, etc. These types of data may be different from each other. For example, the cast data 114A may include a list of actor/actress names, character names, and roles. Meanwhile, the plot data 116A may include a multiple-paragraph description about the plot of the film. These data types are fundamentally different from one another. Further, even data types within the content metadata 114 or contextual data 116 may be different from one another. For example, the cast data 114A (i.e., text strings) is fundamentally different from the year data 114C (i.e., numerical data). Even the cast data 114A and the genre data 114D, which may both be text strings, may be different from one another.

Continuing with FIG. 2, the content comprehension engine 102 may apply word vector embedding operations to the content metadata 114 and to the contextual data 116 to generate collaborative filtering representations of each. Further, in one or more embodiments, the content comprehension engine 102 includes functionality to bridge the collaborative filtering representations of the content metadata and the contextual data to generate the target content item model. For example, the collaborative filtering representations may include the embeddings 1-N 161A-161F. These embeddings may be word vector representations of the content metadata 114 and the contextual data 116. Together, these embeddings constitute the target content item model 161. More than one target item model may be generated, subsets of a single target item model may be considered which effectively result in multiple models, or both.

Returning to FIG. 3, examples 313 illustrate other versions of the similarity function. For example, a similarity embedding function may include functionality to compare a single embedding (e.g., embedding 3 161C) with another content item model (e.g., content item 2 model 152). This may include a comparison of the single embedding with a single embedding of the other content item model, or a comparison with two or more embeddings of the other content item model. In another example, a similarity model function may include functionality to compare a content item model (e.g., target content item model 161) with another content item model (e.g., content item 2 model 152). In yet another example, a similarity model function may include functionality to compare a content item model (e.g., target content item model 161) with a library of models (e.g., content models library 150). It should be understood that other machine learning functions may similarly include functionality to operate one or more embeddings, models, and/or entire libraries.

In one or more embodiments, the content comprehension engine 102 includes functionality to identify a set of existing content item models, where each of the set of existing content item models is associated with at least one corresponding known content item. For example, returning to FIG. 1, a content library 140 may include multiple content items (i.e., content items 1-N 141-143). Content models library 150 may include multiple content item models (i.e., content item 1-N models 151-153). The content item models may each correspond to a content item. For example, content item 1 model 151 may correspond to content item 1 141.

It should be appreciated that while one content item model is shown per content item, there may be multiple content item models that correspond with a single content item. It should also be appreciated that the content models library 150 may include content item models for content items that are either not in the content library 140 or otherwise not publicly accessible (in other words, content items not served to users of a platform).

In one or more embodiments, the content comprehension engine 102 includes functionality to apply deep neural learning to compare (or analyze) the target content item model with the set of existing content item models. For example, the target content item model 161 may be compared with the content item models of the content models library 150. The target content item 110 may be eventually added to the content library 140, and/or the target content item model 161 may be eventually added to the content models library 150 to form the updated content models library 160. It should be appreciated that the word "compare" is used for simple illustration of the concepts, but can be replaced with the word "analyze" in the entirety of the disclosure, because deep neural learning (e.g., machine learning) may perform complex operations that are beyond comparison operations.

Figure 4:
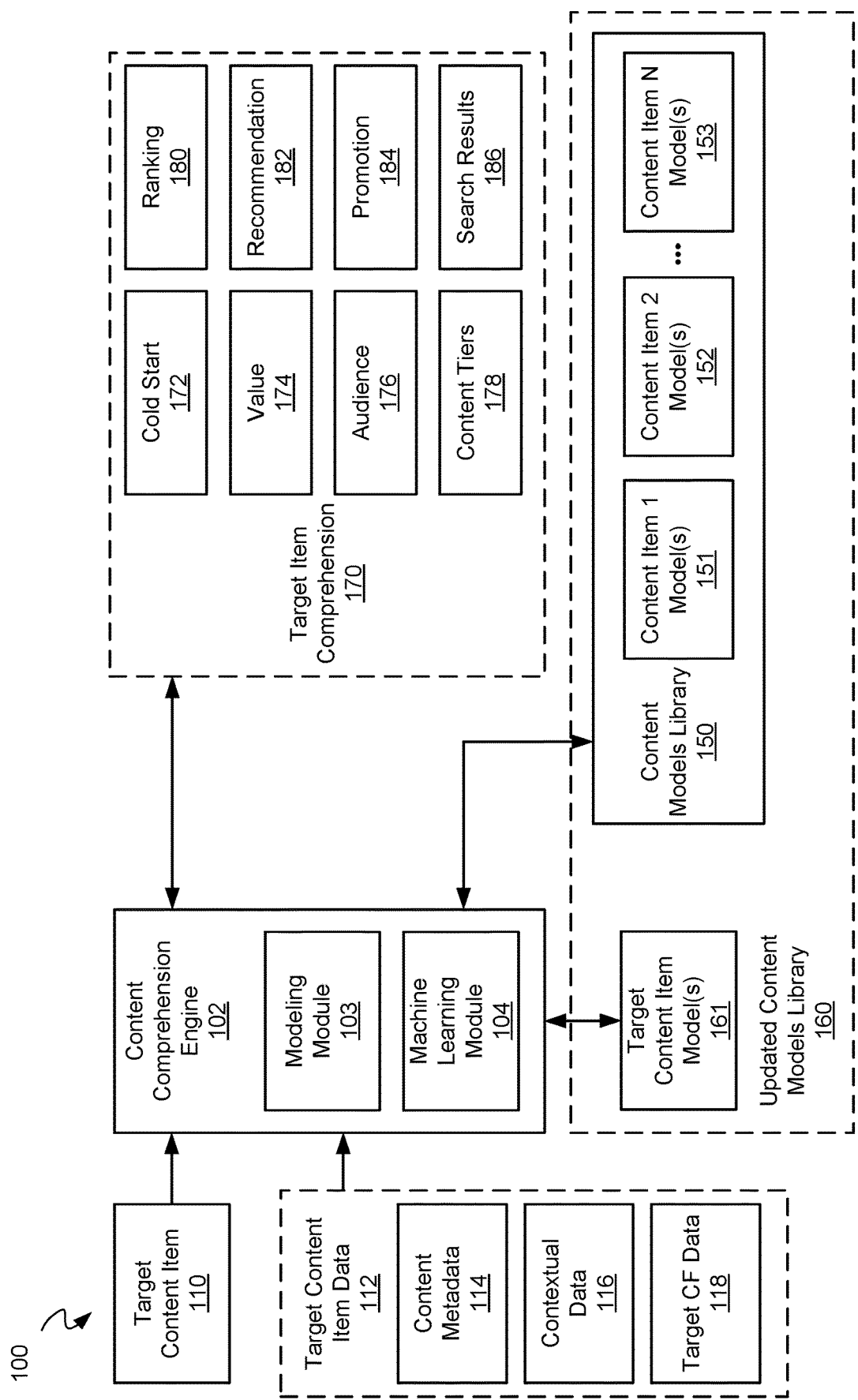
FIG. 4 illustrates a block diagram of a content modeling and comprehension system in accordance with one or more embodiments.

The content comprehension engine 102, in part because of its functionality to compare models, may include functionality to determine a multitude of characteristics about the target content item 110. For example, turning to FIG. 4, target item comprehension 170 may be established, which may include cold-start characteristics 172, content item value 174, audience information 176, relevant content tiers 178, ranking data 180, recommendation characteristics 182, promotional characteristics 184, and search results improvement 186, to name a few.

In one or more embodiments, the content comprehension engine 102 includes functionality to predict performance characteristics of the target content item based on the comparison. For example, turning to FIG. 5A, the target content item 110 may be represented by the "Brigid Joan's Diary" entry, while other content items of the content library 140 may be represented by the rest of the entries. While some information from metadata and contextual data is known about the target content item "Brigid Joan's Diary", because it is a new content item in this example, information like rank with respect to the other content items and value per year are initially empty fields.

However, the content comprehension engine 102 includes functionality to determine which content items in the content library 140 are the most similar to the target content item 110. This comparison can be performed using deep machine learning applied to the target content item model 161 and one or more of the models of the content models library 150. For example, it may be determined that content items "Knotting Hill" (with 66.1% similarity), "Bride & Prejudice" (with 65.8% similarity), "Failed to Launch" (with 62.4% similarity), and "Pretty Women" (with 59.2% similarity) may be the most similar content items. The similarity may be based in part on a combination of the genres, tags, type, and any other information represented in the models that are not necessarily shown.

For example, while the word "London" appears in the tags of Brigid Joan's Diary, the neural deep learning may understand that the word "UK" in Knotting Hill and Bride & Prejudice is closely related to the word "London". The neural deep learning may understand that the words "New York" and "Los Angeles" may also be related. In another example, the word "Businessman" may be related to the word "Wealth", the word "Novelist" may be related to the words "Book store", and so on.

In one or more embodiments, the content comprehension engine 102 includes functionality to determine one or more content tiers associated with the target content item. For example, based on the most similar content items, the content comprehension engine 102 may include functionality to determine one or more content tiers for the target content item 110. Content tiers are categorizations of content items into groups. For example, content items may be, but are not limited to, genres (e.g., romantic comedies, dramas, murder mysteries, etc.). A content tier may be a curation of content items for a particular audience (e.g., "because you watched Love Actuality"), a group of award show nominees or winners, a group of content items created during a particular period, and so on. A content item may be associated with more than one content tier (e.g., associated with romantic comedies, romantic dramas, comedies, and dramas at the same time).

Figure 5C:
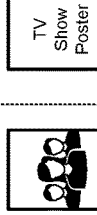
FIGS. 5A-5C illustrate content item and model data in accordance with one or more embodiments.

In one or more embodiments, the content comprehension engine 102 includes functionality to rank the target content item with respect to the existing content item models according to ranking criteria, wherein the ranking criteria is used to rank the target content item model and the set of existing content item models based on at least one multidimensional vector representation. For example, based on the most similar content items, the content comprehension engine 102 may include functionality to determine a predicted rank for the target content item 110. The rank may be determined by an averaging operation, a weighted average operation, or any other suitable operation. For example, turning to FIG. 5B, an average rank may be computed for Brigid Joan's Diary. In the example of FIG. 5B, the rank of 50,226 is an average of the ranks of the four most similar content items. Or, in another example, the average could be weighted based on the similarity of the respective content item.

Based on the most similar content items, the content comprehension engine 102 may include functionality to determine a predicted value for the target content item 110. The value may be determined by an averaging operation, a weighted average operation, or any other suitable aggregation operation. For example, continuing with FIG. 5B, an average value per year may be computed for Brigid Joan's Diary. In the example of FIG. 5B, the rank of $6,344 is an average dollar value of the values of the four most similar content items. Or, in another example, the average could be weighted based on the similarity of the respective content item. In yet other examples, the value could be represented by any key performance indicator (KPI). For example, the KPI could represent how many search queries (exact and similar search strings) have been received, how many more audience members will be attracted by the content item, how many audience members will be retained by the content item, how much the content item will fill areas of the library that may be less populated, and so on. It should be appreciated that multiple value fields may exist, for example, both a dollar value per year and an audience attraction KPI.

In some embodiments, the content comprehension engine 102 may include functionality to determine the most relevant, accurate, or dependable KPIs. Not all KPIs may be good indicators of the value of content items, even if they would seem to be by an operator, or have been in the past or other contexts. For example, a higher amount of upvotes by user accounts would seem to correlate to a more valuable content item, but the upvotes could be a result of an active minority. The content comprehension engine 102 may instead learn which KPIs correlate best with rank, revenue, and so on.

In one or more embodiments, the content comprehension engine 102 includes functionality to predict relevant audiences for the target content item. For example, based on performance metrics of the most similar content items, relevant audiences may be predicted. Performance metrics may include information such as the demographics of the viewing audience (age, sex/gender, location, etc.), audience member past behavior like how often they repeat viewing the content item (e.g., a cult-classic film versus a news-based show limited only to current events), during what part of the year (e.g., near award show season, sports playoffs, etc.) or what hour of the day (e.g., cartoons in the morning or weekends) the content item is viewed, and so on. The target content item 110 may then be served based on the predicted audiences information. For example, the target content item 110 may be suggested to accounts with particular demographics or during times accordingly to the predicted audiences information.

In one or more embodiments, the content comprehension engine 102 includes functionality to determine acquisition or retention recommendation metrics related to the target content item. For example, the platform may not yet have acquired ownership/licensing for the target content item 110 with respect to one or more regions or markets, but is seeking to acquire ownership/licensing. Or, the platform may have acquired ownership/licensing for the target content item 110, but does not retain ownership/licensing for all content items indefinitely. Based on various information about the target content item 110 collected or generated by the content comprehension engine 102 (e.g., ranking information, value information, audience prediction, and so on), the content comprehension engine 102 may provide acquisition recommendation metrics. The acquisition recommendation metrics may include information such as an overall recommendation score (e.g., a percentage or absolute value indicating the strength of the recommendation to acquire/retain), specific periods of time to license the content, durations of time to license the content, one or more other content items suggested to be acquired/retained along with the content item, and so on.

It should be understood that, in one or more embodiments, the content comprehension engine 102 includes functionality to perform the functions discussed herein on groups of content items. For example, as discussed above, determining acquisition/retention recommendation statistics with respect to a grouping or cluster of content items, as opposed to each content item of the group separately. In other words, while a single content item may receive a low acquisition/retention score, it may include a higher score when coupled with other content items.

In one or more embodiments, the content comprehension engine 102 includes functionality to compare different types of items. For example, turning to FIG. 5C, the film Brigid Joan's Diary is shown once again. However, the rest of the entries are not necessarily films. For example, "Layne the Virgin" is a tv show, "Love Hurts" is a song, "Rom CoMs" is a playlist of tv shows and movies, and "Joan's Diary Notebook" is a merchandise product. This is made possible by the use of collaborative filtering models, which are capable of representing not only disparate data types, but also model items that are fundamentally different.

As a result, a model representing a particular item type (e.g., a film) may be compared with models representing one or more different item types (e.g., those described above). Accordingly, it should be understood that the amount of different item types that may be modeled, and thereby compared, is virtually limitless. For example, music, podcasts, books, articles, events, products like merchandise, playlists, restaurants, social media platform groups, and so on. It should further be understood that while much of this disclosure discusses film content items, film is simply used to illustrate the many concepts, and the concepts are in no way limited to film.

In one or more embodiments, the content comprehension engine 102 includes functionality to identify preexisting collaborative filtering data corresponding to the target content item, and bridge the preexisting collaborative filtering data with the collaborate filtering representations of the content metadata and the contextual data to generate the target content item model. For example, returning to FIG. 1, the target content item data 112 may include the target collaborative filtering (CF) data 118. The target CF data 118 may be similar to the target content item model 161, the embeddings 1-N 161A-161F, and/or the content item 1-N models 151-153, in that the target CF data 118 may include data in a word vector embedded form.

As depicted in FIG. 2 the target CF data 118 may include internal historical collaborative filtering (CF) data 118A, external collaborative filtering (CF) data 118B, or other types of collaborative filtering data. The internal historical CF data 118A may include collaborative filtering data about the target content item 110 generated previously. For example, the internal historical CF data 118A may be a prior version of the target content item model 161. In other words, the internal historical CF data 118A may have been previously generated to represent the target content item 110. Such an instance of the internal historical CF data 118A may include different information, for example, rank or value information corresponding to a prior period of time and/or a prior content library 140 landscape. It should be appreciated that the internal historical CF data 118A may include a subset or a superset of the data included by the target content item model 161.

The external CF data 118B may include collaborative filtering data about the target content item 110 generated previously. For example, the external CF data 118B may include collaborative filtering data provided by a $3^{rd}$ party source. The $3^{rd}$ party source may be a platform that compiles collaborative filtering data about content items of the platform, a service that specializes in generating collaborative filtering data about content items, a critic or user reviews platform that compiles collaborative filtering data about content items, or any other source capable of compiling collaborative filtering data.

In one or more embodiments, the content comprehension engine 102 includes functionality to generate a new content item model, or update an existing content item model, for a content item that already exists in the content library 140. For example, deep neural learning may be applied to content item 2 142, any corresponding content item data (e.g., content metadata, contextual data, and/or internal/external CF data), and/or content item 2 model(s) 152. The internal CF data may be the same object as the content item 2 model(s) 152, or it may be an additional earlier version. In any case, the result can be either an updated version of content item 2 model(s) 152 or new content item model. Accordingly, the content models library 150 may be periodically or continuously updated.

As previously discussed, in one or more embodiments, the content comprehension engine 102 includes functionality to apply deep neural learning to compare the target content item model with the set of existing content item models. Further, in one or more embodiments, the content comprehension engine 102 includes functionality to determine cold-start characteristics of the target content item based on the comparison. Content serving platforms may include a vast and varied library of content items. Each content item may include unique platform performance characteristics, and these characteristics may vary widely. Accordingly, "cold-starting" a content item (in other words, adding a content item) optimally is a difficult task.

For example, some content items may be generally popular, while other content items may be popular only among one or a few audience segments, while yet other content items may not be popular at all. In another example, some content items may belong in certain categories, while other content items may belong in other categories, while yet other content items may belong in multiple categories. It is essentially impossible to determine, across vast and varied platform libraries, where a new content item fits (e.g., how it should be presented to platform users). In other words, how to "cold-start" the content item on a platform.

For example, if a content item were to be added to a vast library of content items without promotion to platform users, it would very likely not be discovered rapidly by users. Even if that content item has potential to be popular, it will likely still not perform well because it will stay relatively undiscovered. Meanwhile, if content items that have lower potential to be popular are frequently presented to platform users, the user experience of the platform would likely suffer.

Figure 5A:
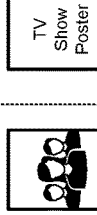
Figure 5B:
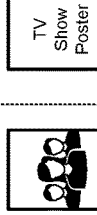
Figure 6A:
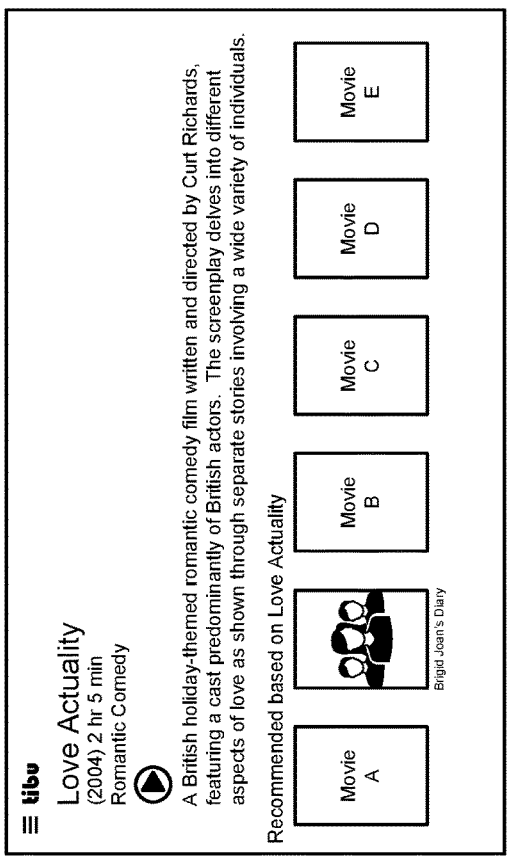
FIGS. 6A-6D illustrate various platform displays in accordance with one or more embodiments.

Turning to FIG. 6A, while continuing the example of FIGS. 5A and 5B, a user interface provided by a content platform is shown. The user interface presents one or more content items, for example, movies A-E and "Knotting Hill" are presented in a carousel user interface element. Because movies A-E and "Knotting Hill" may be categorized as belonging to a romantic comedy content tier, they may appear as part of a "Romantic Comedies" section. The user interface of FIG. 6A demonstrates the content platform's content offering before the new target content item Brigid Joan's Diary has been added to the content platform (e.g., to the content library 140), or after the new target content item Brigid Joan's Diary has been added to the content platform but not promoted based on cold-start characteristics.

In one or more embodiments, the content comprehension engine 102 includes functionality to provide the cold-start characteristics for distribution management of the target content item. And in one or more embodiments, the content comprehension engine 102 includes functionality to provide a grouping of content items (e.g., to a requesting module in a platform) such that the target content item is arranged with respect to known content items based on the cold-start characteristics.

Figure 6B:
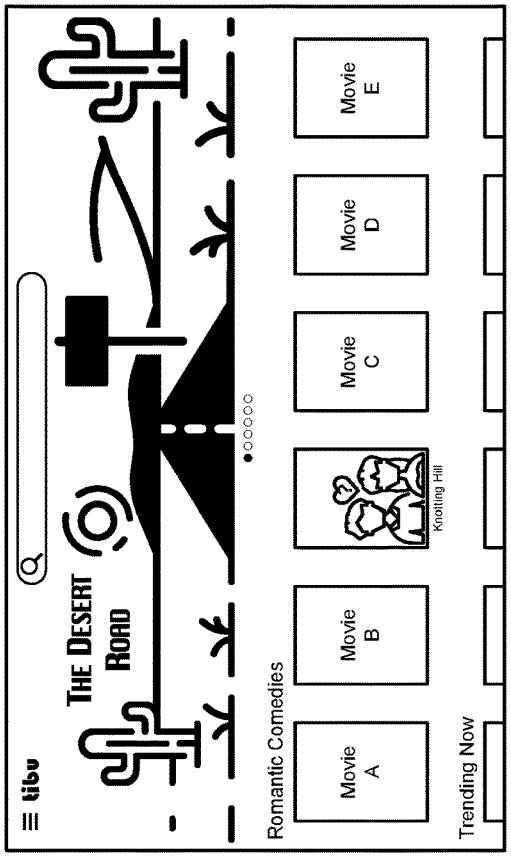
Figure 6C:
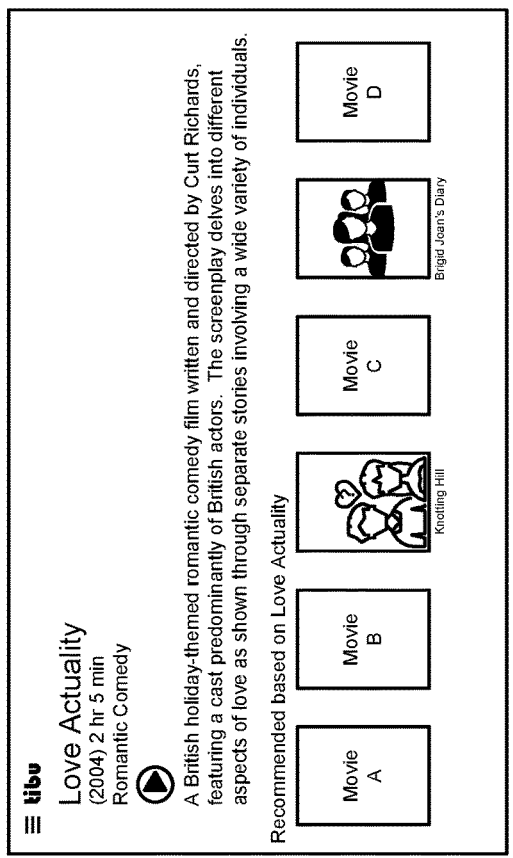
Figure 6D:
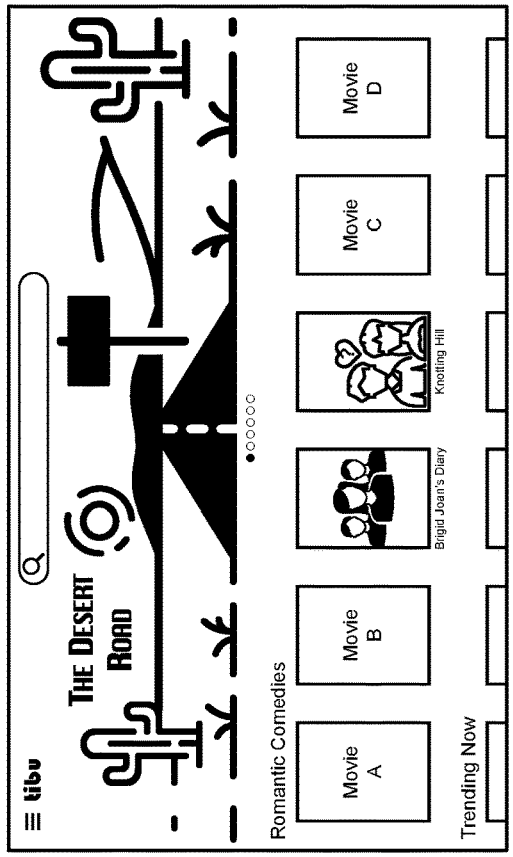

For example, the content comprehension engine 102 may indicate that the target content item should be served in connection with the next most similar content item (or a set of similar content items, optionally weighted based on respective similarity). Such a similar content item may be referred to as a chaperone content item (or a surrogate content item). In one illustrative example, based on the similarity of Brigid Joan's Diary to Knotting Hill (as depicted by FIG. 5B), the platform may display the new content item Brigid Joan's Diary along with or near the chaperone content item Knotting Hill (as depicted by FIGS. 6B and 6C). For example, as shown by FIG. 6B, Brigid Joan's Diary is displayed right before Knotting Hill. Or as shown by FIG. 6D, which shows a content item-specific page, Brigid Joan's Diary is displayed somewhere near Knotting Hill in a carousel of content items recommended based on the content item-specific page. As a result, the new content item (e.g., Brigid Joan's Diary) may be served in a fashion that is likely appropriate for the new content item (sections, position, frequency, etc.).

In one or more embodiments, the content comprehension engine 102 includes functionality to receive platform performance metrics corresponding to the target content item, update the target content item model based on the performance metrics, and provide, based on the updated target content item model, warm-start characteristics for distribution management of the target content item. For example, after a period of time, or an amount or ratio of requests for the new content item and/or the chaperone content item, the platform may provide performance metrics about the new content item (e.g., Brigid Joan's Diary). The content comprehension engine 102 may then update the corresponding target content item model 161 (e.g., rank, relevant audiences, etc.) based on the performance metrics. The content comprehension engine 102 may then provide warm-start characteristics based on the updated target content item model 161. Warm-start characteristics may be similar to cold-start characteristics, however, they may be updated based on the content item's performance on the platform. Because the new content item may now have had an opportunity to build momentum (aka platform velocity) while benefiting from the approximation of its actual status, the platform may utilize the warm-start characteristics for the new content item in part or fully in place of the chaperone-based promotion.

In one or more embodiments, the content comprehension engine 102 includes functionality to determine content categories associated with the target content item based on the cold-start characteristics. It should be understood that cold-starting based on the deep neural learning information (e.g., models and information depicted in part by FIG. 5B) is not limited to chaperoning. For example, cold-start characteristics could indicate a content tier or content category, and rank, for which the new content item should be served in connection with. Referring to FIG. 6C, for example, cold-start characteristics for Brigid Joan's Diary may indicate that it should be served around or at the second position for films recommended based on Love Actuality, regardless of the position or existence of Knotting Hill.

Figure 7B:
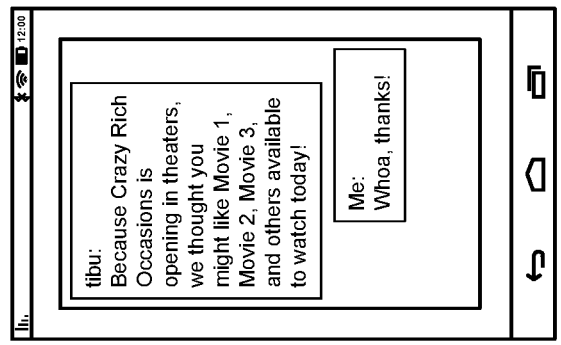
FIGS. 7A-7B illustrate various platform displays in accordance with one or more embodiments.
Figure 7A:
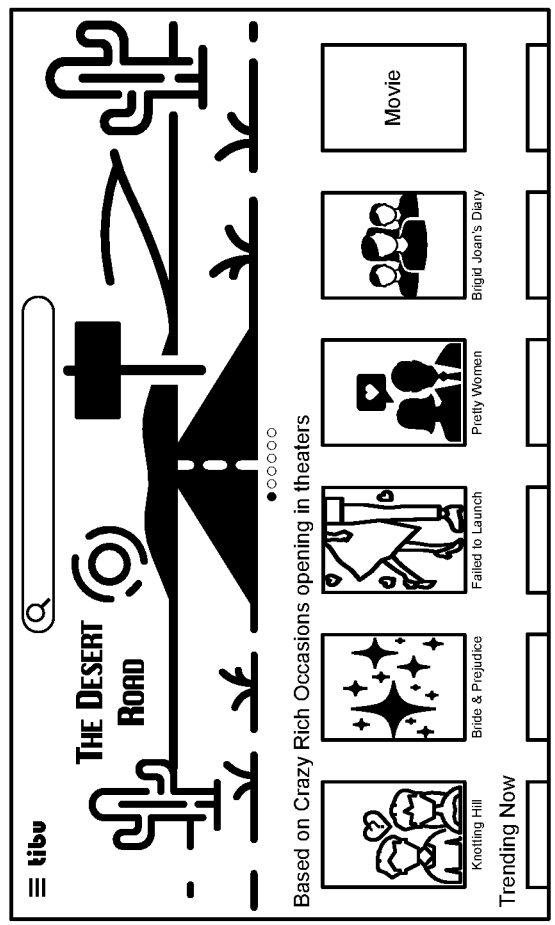

In one or more embodiments, the content comprehension engine 102 includes functionality to provide a grouping of content items based on their similarity to a content item that is unavailable on the platform. For example, referring to FIG. 7A, the film "Crazy Rich Occasions" may be opening or have already opened in theaters, but is not available on the platform. The content comprehension engine 102, utilizing concepts described in this disclosure, may determine which known/available content items are most similar or relevant to the unavailable content item. For example, the content comprehension engine 102 may generate a content item model representing the unavailable content item (e.g., Crazy Rich Occasions), compare that unavailable content item model with models of the content models library 150, and determine which are the most relevant content library 140 content items.

The grouping of content items may be presented to audiences in various ways. For example, continuing with FIG. 7A, the grouping (i.e., the similar or relevant content items) may be provided through a user interface carousel in a section related to the unavailable content item (i.e., Crazy Rich Occasions). In another example, referring to FIG. 7B, a message may be sent to users of the platform informing them of the grouping (e.g., via email, social media platform messaging services, cellular phone text messages, and so on). In yet another example, an "in-app" notification may inform users of the grouping (e.g., on a smart phone or tablet application, a smart TV application, a website interface, and so on).

It should be appreciated that unavailable content items are not limited to films in theater, but may include any content item that is not available on the platform. For example, a TV show exclusively on a different platform or TV network, a Broadway theater performance, an older movie not licensed to the platform, and so on.

Figure 8A:
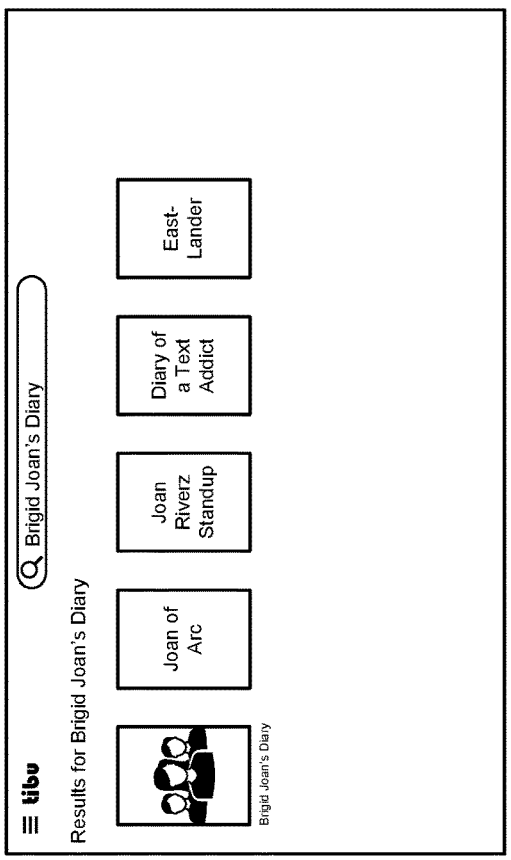
FIGS. 8A-8G illustrate various platform displays in accordance with one or more embodiments.
Figure 8C:
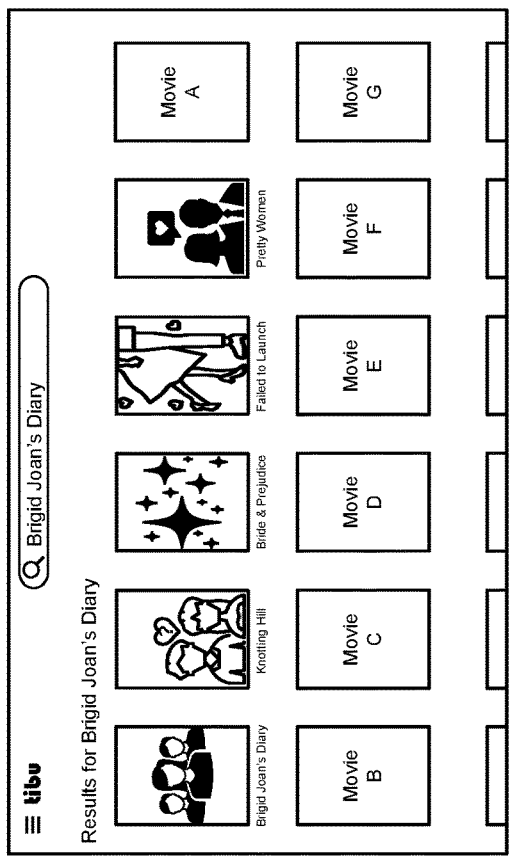

With reference to FIG. 8A, which demonstrates search operation behavior of a conventional system, a user of the platform may submit a search query (e.g., "Brigid Joan's Diary"). In a conventional system, the results may include content items that contain text strings that strictly match text strings of the content item search request. For example, as demonstrated by FIG. 8A, "Joan of Arc" and "Joan Riverz Standup" may be search results because they both contain the word "Joan". Continuing the example, "Diary of a Text Addict" may be a search result because it contains the word "Diary". Lastly, "East-Lander" may be a search result because it contains one of the words "Brigid", "Joan", or "Diary" somewhere in its metadata. Meanwhile, Brigid Joan's Diary may not be a search result because it is not available on the platform. Or, as demonstrated by FIG. 8C, Brigid Joan's Diary may also be a search result because it is available on the platform. In either case, none of the other search results may actually be relevant to "Brigid Joan's Diary" besides sharing similar words. As a result, not only is the content item searched for unavailable, but the search results are irrelevant.

In one or more embodiments, the content comprehension engine 102 includes functionality to receive a content item search request. For example, turning to FIG. 8B, a user of the platform may submit the same search query (e.g., "Brigid Joan's Diary").

In one or more embodiments, the content comprehension engine 102 includes functionality to identify a first candidate content item matching the content item search request. For example, the content comprehension engine 102 may identify the first candidate content item entitled "Brigid Joan's Diary". In identifying the first candidate content item, the content comprehension engine 102 may only identify the content item if a threshold match strength or confidence score is met. Further, the first candidate content item may not necessarily be available on or stored by the platform (e.g., in the content library 140), but the first candidate content item may be "known" via a corresponding content item model (e.g., in the content models library 150).

In one or more embodiments, the content comprehension engine 102 includes functionality to identify a first content item model corresponding to the first candidate content item, where the first content item model includes word vector collaborative filtering representations of the first candidate content item. For example, the content comprehension engine 102 may identify a content item model in the content models library 150 that corresponds to the first candidate content item. As discussed herein, such content item models may include word vector collaborative filtering representations (e.g., representing metadata, contextual data, and/or other collaborative filtering data).

In one or more embodiments, the content comprehension engine 102 includes functionality to identify a set of content item models where each is associated with at least one corresponding available content item and includes word vector collaborative filtering representations of the corresponding available content items. For example, the content comprehension engine 102 may identify content item models of content models library 150 that each correspond to available content items. In some embodiments, an available content item is one that is available to be served to a requesting account (e.g., content owned/licensed for the region of the requesting account).

In one or more embodiments, the content comprehension engine 102 includes functionality to apply deep neural learning to compare the first content item model with the set of content item models to generate a subset of the content item models most relevant to the first content item model. For example, as discussed herein, the content comprehension engine 102 may analyze the collaborative filtering data (e.g., word vectors) representing the content items to reveal properties such as rank, similarity, value, and so on. For example, as depicted by FIG. 5B, content items with the most similarity to the target content item may be determined based on their models. Continuing the example, the models of the most relevant or similar content items with respect to Brigid Joan's Diary's model may be included in the subset of the content item models.

In one or more embodiments, the content comprehension engine 102 includes functionality to generate a result set of available content items corresponding to the subset of the content item models most relevant to the first content item model. For example, the generated result set may include those items in the content library 140 that correspond to the subset of the content item models most relevant to the first content item model (e.g., from the content item models in the content models library 150). Returning to the example of FIG. 5B, those may include content items "Knotting Hill" (with 66.1% similarity), "Bride & Prejudice" (with 65.8% similarity), "Failed to Launch" (with 62.4% similarity), and "Pretty Women" (with 59.2% similarity). The result set may include only those content items that are available (e.g., ownership/licensing is possessed for the content item for the account corresponding to the search request).

Figure 8B:
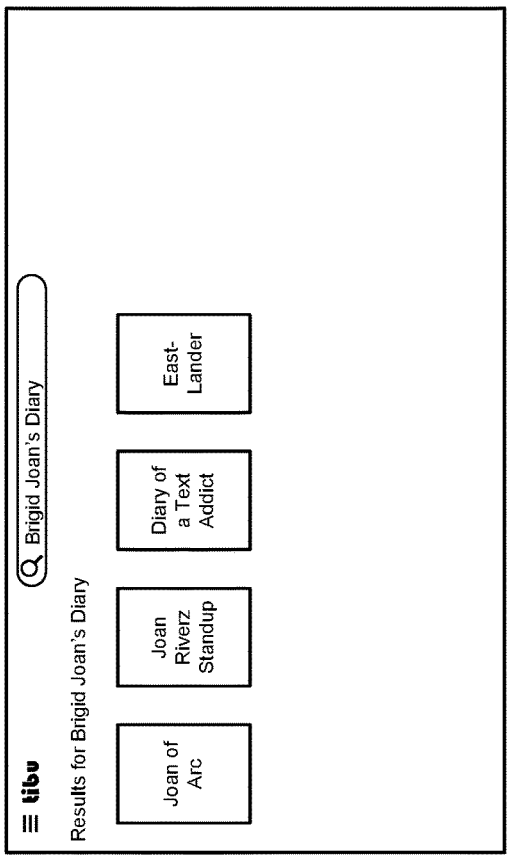

In one or more embodiments, the content comprehension engine 102 includes functionality to provide, in response to the content item search request, the result set of available content items. For example, as depicted by FIG. 8B, the content items shown in FIG. 5B as well as other relevant and available content items (e.g., movies A-F) are provided for display in a search results area of the account corresponding to the search request. Accordingly, relevant and available content items are provided in response to the search request. Brigid Joan's Diary may not be a search result if it is not available on the platform.

Figure 8D:
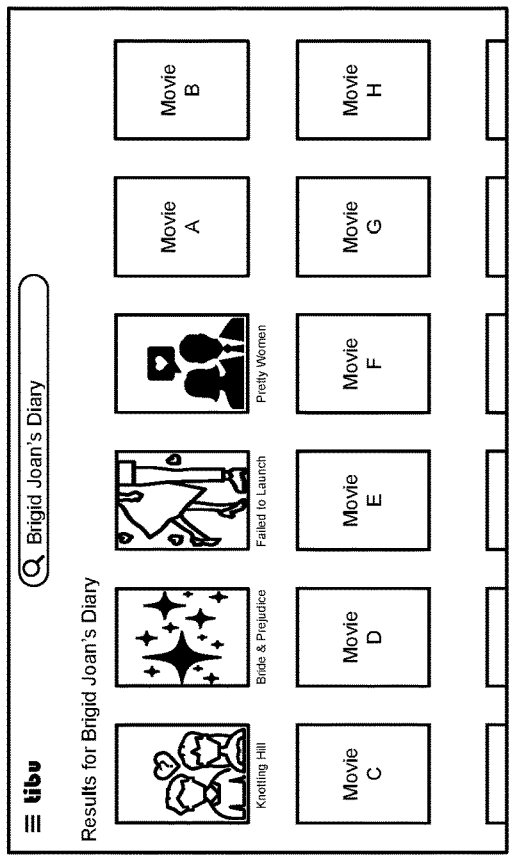

In one or more embodiments, the deep neural learning may include determining that the first candidate content item is an available content item and including, a content item model corresponding to the first candidate content item, in the set of the content item models most relevant to the first content item model. For example, continuing the example with FIG. 8D, if the first candidate content item Brigid Joan's Diary is available, then including Brigid Joan's Diary's model in the set of the content item models. As a result, the Brigid Joan's Diary content item may be included in the result set and provided in response to the search request. Accordingly, Brigid Joan's Diary may also be provided for display in the search results area of the account.

In one or more embodiments, the deep neural learning may include ranking the subset of the content item models according to ranking criteria. The ranking criteria may include, but is not limited to, relevancy, temporal relevancy, similarity, popularity, value, promotional status, requesting account demographics, requesting account preferences, and/or requesting account past behavior. For example, particular content items may be more temporally relevant because they are related to current events, related to a movie that has been or is being released in theaters, related to an upcoming holiday, involved in an upcoming or recent awards show, and so on. In another example, particular content items may be more temporally relevant because the search request is received during a time of the day more relevant to those particular content items, for example, during the morning when cartoons are at their highest demand, during the afternoon when soap operas are at their highest demand, during the evening when dramas are at their highest demand, and so on. Accordingly, such content items may be ranked more highly.

Particular content items that are more popular (e.g., have more viewing or a higher general platform ranking) or have higher value (e.g., revenue or other KPIs) may be ranked more highly. Particular content items that are to be promoted in general, or to particular audiences, may be ranked more highly in general or to those particular audiences, respectively. Particular content items that may be more relevant according to the requesting account's demographics (e.g., age, sex/gender, location, etc.), preferences (e.g., as specified by the account), past behavior (e.g., viewing behavior), account type (e.g., paid, free, parental controlled, etc.), account device type (e.g., smart TV, laptop, tablet, smart TV, set-top box, smart phone, etc.), and/or content format (e.g., real-time streaming, locally downloaded, etc.) may be ranked more highly.

Figure 8G:
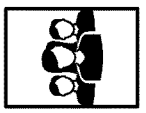
Figure 8E:
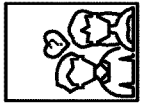

In one or more embodiments, the content comprehension engine 102 includes functionality to include the results of the ranking for use in arranging a display of the available content items according to the results of the ranking. For example, as demonstrated by FIG. 8D, the display of results is arranged by the ranking. Specifically, the highest-ranking content item Brigid Joan's Diary is positioned in first place, followed by the next highest-ranking content items in order (e.g., based on the similarity established in FIG. 5B), followed by the next highest-ranking content items A-G. As will be discussed below, results organized by content tier may be arranged by rank within each content tier (e.g., FIG. 8E) and results of different content types may be arranged by absolute rank or by algorithms promoting a hybrid display of content types.

In one or more embodiments, the content comprehension engine 102 includes functionality to include content tier information corresponding to each available content item in the result set for use in arranging a display of the available content items according to content tier. For example, as demonstrated by FIG. 8E, the display of results is organized by content tier.

Figure 8F:

In one or more embodiments, the deep neural learning includes determining a set of content tiers most relevant to the first content item model, and where generating the result set involves including the set of content tiers for display. For example, as demonstrated by FIG. 8F, the display of results includes content tiers relevant to the search query. It should be appreciated that in some embodiments, the content tiers and content items may be presented side by side in a hybrid arrangement, as opposed to in their respective sections.

In one or more embodiments, the content comprehension engine 102 includes functionality to determine that a match strength between the first candidate content item and the content item search request is below a threshold match strength. In response to that determination, a second candidate content item may be identified and used for the deep neural learning comparison. For example, if the search string is "jons diary", the search string's match strength with respect to "Brigid Joan's Diary" may be below a threshold match strength (e.g., a match strength of 54% that is below a threshold match strength of 80%). In response, the content item with the next highest match strength may be identified. As an example, the content item "Indianapolis Jons" with a match strength of 52%. The content comprehension engine 102 may perform similar steps as those discussed with respect to the first candidate content item and update the result set with those available content items identified as a result of applying the deep neural learning analysis to the second candidate content item (e.g., Indianapolis Jons). Accordingly, the result set provided in response to the search request may include available content items related to both the first and second candidate content items (e.g., Brigid Joan's Diary and Indianapolis Jons).

In one or more embodiments, the result set of available content items includes at least one content item of a different type from a type of the first content item model. For example, as demonstrated by FIG. 8G, the result set may include movies (e.g., like those demonstrating similarity in FIG. 5B) and other content items (e.g., like those showing similarity in FIG. 5C).

In general, determining various value properties of a particular content item is difficult. For example, the value of a content item is not simply based on the revenue correspondingly directly generated by the content item, nor an amount of engagement with the content item. For example, the presence of the particular content item may promote more or less engagement with other content items, which is an indirect value property of the particular content item. In other words, if the particular content item was never present, engagement with the rest of the platform may have been different, being that the platform offering would be at least slightly different.

In one or more embodiments, the content comprehension engine 102, or other modules of the platform, includes functionality to omit a particular content item from an evaluation subset of platform accounts. In other words, the particular content item will not be available for playback, not presented as a recommended item, not included in search results, and so on. The content items may otherwise be available to other accounts of the platform.

Figure 9A:
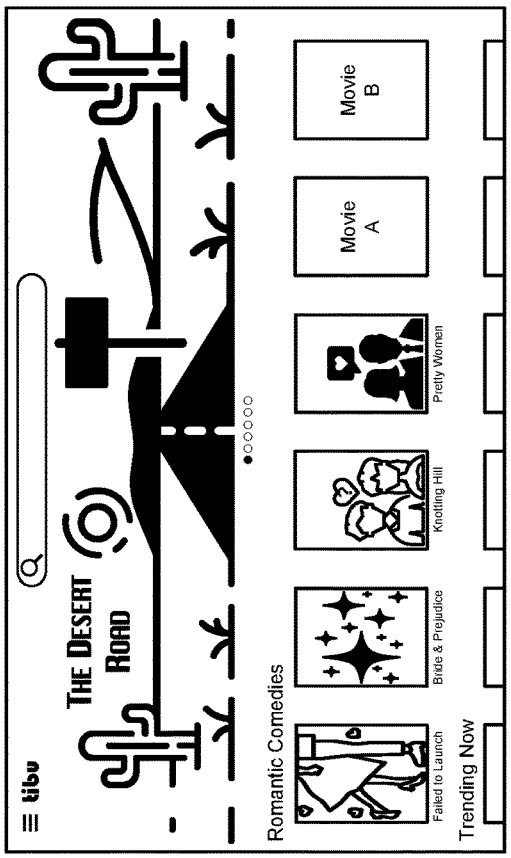
FIGS. 9A-9C illustrate various platform displays in accordance with one or more embodiments.
Figure 9C:
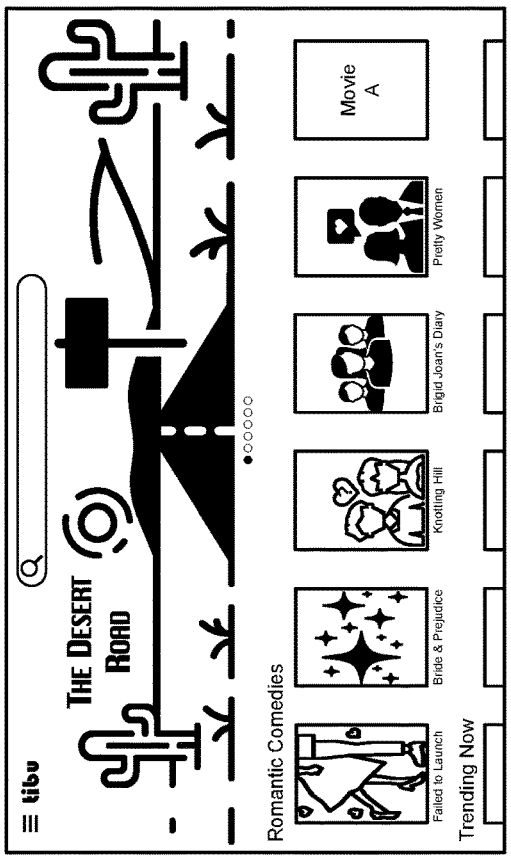
Figure 9B:
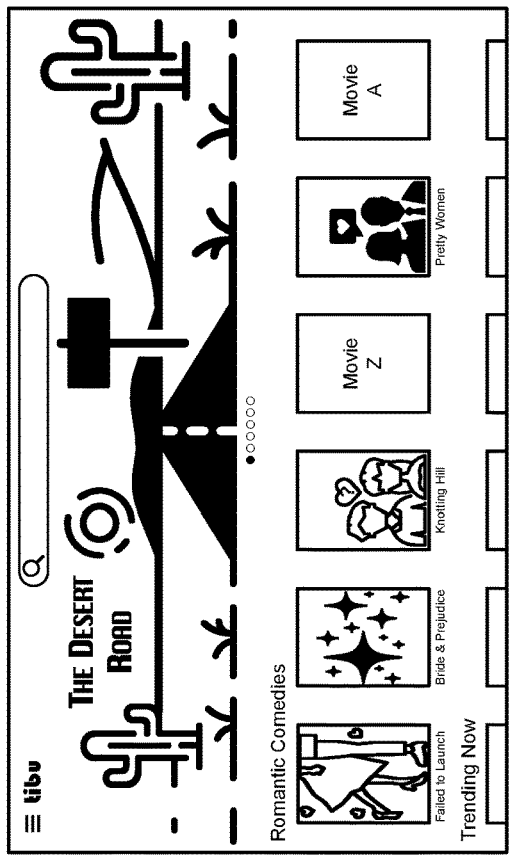

For example, FIG. 9A demonstrates a display presented to a regular account (one of the other accounts of the platform) without a content item holdback. Specifically, in this example, Brigid Joan's Diary is present. FIG. 9B demonstrates a display presented to an account in the evaluation subset of platform accounts with a content item holdback. Specifically, in this example, Brigid Joan's Diary is not present, but instead replaced with movie Z. FIG. 9C demonstrates a different version of a display that may be presented to an account in the evaluation subset of platform accounts with a content item holdback. Specifically, in this example, Brigid Joan's Diary is not present, but instead of being replaced with movie Z, the rest of the content items in the respective group are simply shifted over.

In one or more embodiments, the content comprehension engine 102 may analyze the difference in engagement between the evaluation subset of platform accounts and the other platform accounts. The content comprehension engine 102 may implement deep neural learning for performing the analysis. Based on the analysis, the content comprehension engine 102 may determine the value (e.g., revenue or other KPIs) of the particular content item. Such values may be used for various purposes, for example, determining whether to initiate or retain ownership/licensing for the content item, determining whether to initiate or retain ownership/licensing for other content items, determining how much to promote the content item, and so on.

In one or more embodiments, the evaluation subset of platform accounts may be selected at random. In some embodiments, the evaluation subset of platform accounts may be selected based on account demographics (e.g., age, sex/gender, location, etc.), account preferences (e.g., as specified by the account), past account behavior (e.g., viewing behavior), account type (e.g., paid, free, parental controlled, etc.), account device type (e.g., smart TV, laptop, tablet, smart TV, set-top box, smart phone, etc.), and/or content format (e.g., real-time streaming, locally downloaded, etc.).

It should be appreciated that multiple content items may be held back simultaneously. For example, episodes of a TV show season may be held back simultaneously, or movies sharing a genre or content tier. The multiple held back content items may all be held back from the same single subset of platform accounts, or each may be held back from different subsets of platform accounts.

Figure 10:
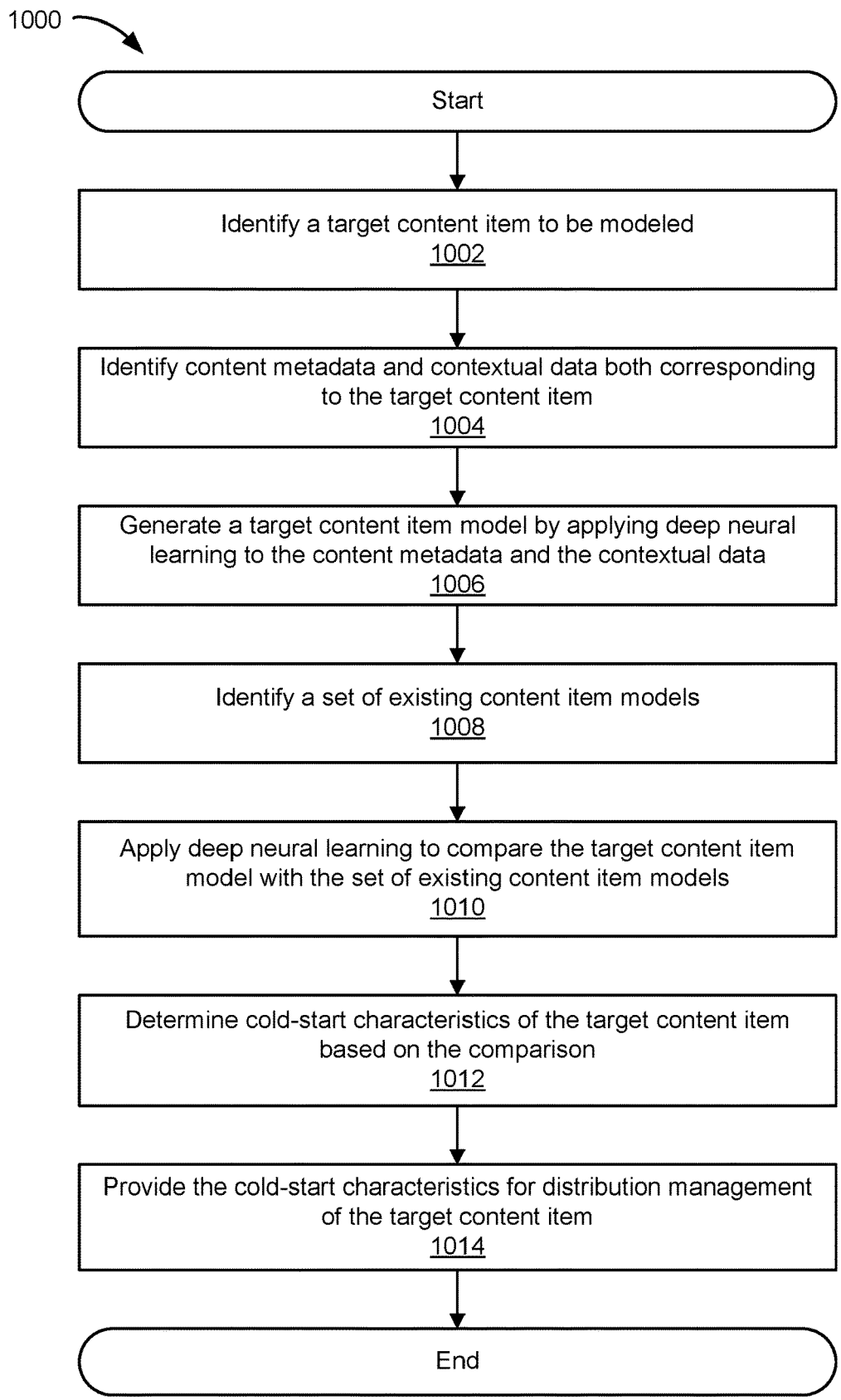
FIGS. 10 and 11 illustrate flowcharts in accordance with one or more embodiments.

FIG. 10 shows a flowchart of a method for cold-starting content (e.g., on a platform using machine learning). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 10 should not be construed as limiting the scope of the invention.

In STEP 1002, a target content item to be modeled is identified.

In STEP 1004, content metadata and contextual data both corresponding to the target content item are identified.

In STEP 1006, a target content item model is generated by applying deep neural learning to the content metadata and the contextual data. In one or more embodiments, the deep neural learning applies a word vector embedding operation to the content metadata to generate a collaborative filtering representation of the content metadata, applies a word vector embedding operation to the contextual data to generate a collaborative filtering representation of the contextual data, bridges the collaborative filtering representations of the content metadata and the contextual data to generate the target content item model.

In STEP 1008, a set of existing content item models are identified. In one or more embodiments, each of the set of existing content item models is associated with at least one corresponding known content item.

In STEP 1010, deep neural learning is applied to compare the target content item model with the set of existing content item models.

In STEP 1012, cold-start characteristics of the target content item are determined based on the comparison.

In STEP 1014, the cold-start characteristics for distribution management of the target content item are provided.

Figure 11:
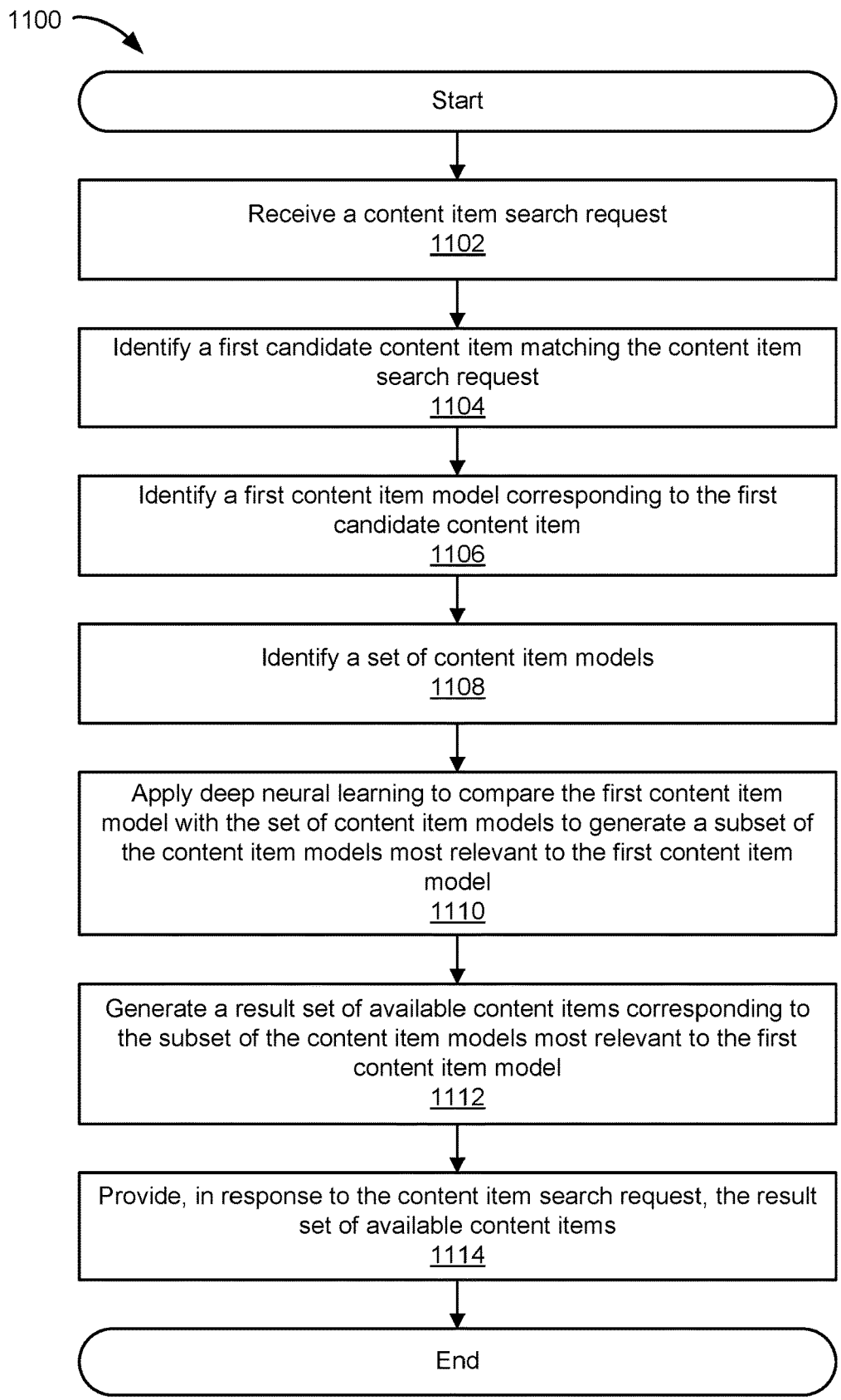

FIG. 11 shows a flowchart of a method for intuitive search operation results using machine learning. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 11 should not be construed as limiting the scope of the invention.

In STEP 1102, a content item search request is received.

In STEP 1104, a first candidate content item matching the content item search request is identified.

In STEP 1106, a first content item model corresponding to the first candidate content item is identified. In one or more embodiments, the first content item model includes word vector collaborative filtering representations of the first candidate content item.

In STEP 1108, a set of content item models is identified. In one or more embodiments, each of the set of content item models is associated with at least one corresponding available content item and includes word vector collaborative filtering representations of the associated at least one corresponding available content item.

In STEP 1110, deep neural learning is applied to compare the first content item model with the set of content item models to generate a subset of the content item models most relevant to the first content item model.

In STEP 1112, a result set of available content items corresponding to the subset of the content item models most relevant to the first content item model is generated.

In STEP 1114, in response to the content item search request, the result set of available content items is provided.

In one or more embodiments, methods for cold-starting content (e.g., including STEPs 1000-1014 of FIG. 10) and methods for intuitive search operation results (e.g., including STEPs 1102-1114 of FIG. 11), may be performed either sequentially or in parallel. It should be appreciated that in one or more embodiments, the steps of FIG. 10 can be executed by the same or different module(s) (or processors) from the module(s) (or processors) executing the steps of FIG. 11.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 12:
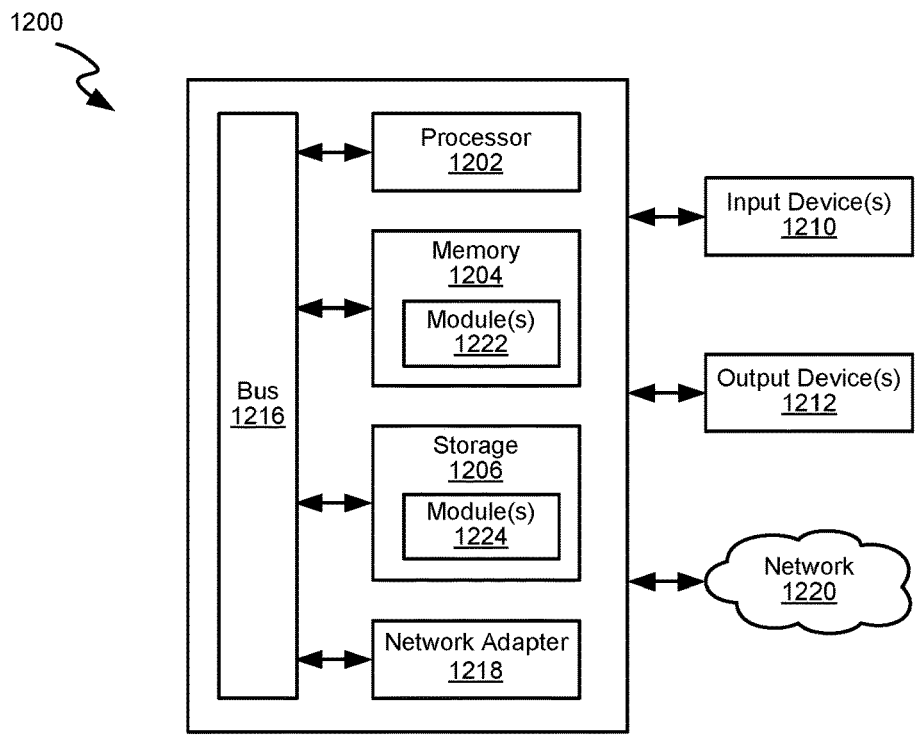
FIGS. 12 and 13 show a computing system and network architecture in accordance with one or more embodiments.

For example, as shown in FIG. 12, the computing system 1200 may include one or more computer processor(s) 1202, associated memory 1204 (e.g., random access memory (RAM), cache memory, flash memory, etc.), one or more storage device(s) 1206 (e.g., a hard disk, an optical drive such as a compact disk (CD) drive or digital versatile disk (DVD) drive, a flash memory stick, etc.), a bus 1216, and numerous other elements and functionalities. The computer processor(s) 1202 may be an integrated circuit for processing instructions. For example, the computer processor(s) may be one or more cores or micro-cores of a processor.

In one or more embodiments, the computer processor(s) 1202 may be an integrated circuit for processing instructions. For example, the computer processor(s) 1202 may be one or more cores or micro-cores of a processor. The computer processor(s) 1202 can implement/execute software modules stored by computing system 1200, such as module(s) 1222 stored in memory 1204 or module(s) 1224 stored in storage 1206. For example, one or more of the modules described herein can be stored in memory 1204 or storage 1206, where they can be accessed and processed by the computer processor 1202. In one or more embodiments, the computer processor(s) 1202 can be a special-purpose processor where software instructions are incorporated into the actual processor design.

The computing system 1200 may also include one or more input device(s) 1210, such as a touchscreen, keyboard, mouse, microphone, touchpad, electronic pen, or any other type of input device. Further, the computing system 1200 may include one or more output device(s) 1212, such as a screen (e.g., a liquid crystal display (LCD), a plasma display, touchscreen, or other display device), a printer, external storage, or any other output device. The computing system 1200 may be connected to a network 1220 (e.g., a local area network (LAN), a wide area network (WAN) such as the Internet, mobile network, or any other type of network) via a network interface connection 1218. The input and output device(s) may be locally or remotely connected (e.g., via the network 1220) to the computer processor(s) 1202, memory 1204, and storage device(s) 1206.

One or more elements of the aforementioned computing system 1200 may be located at a remote location and connected to the other elements over a network 1220. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 13:
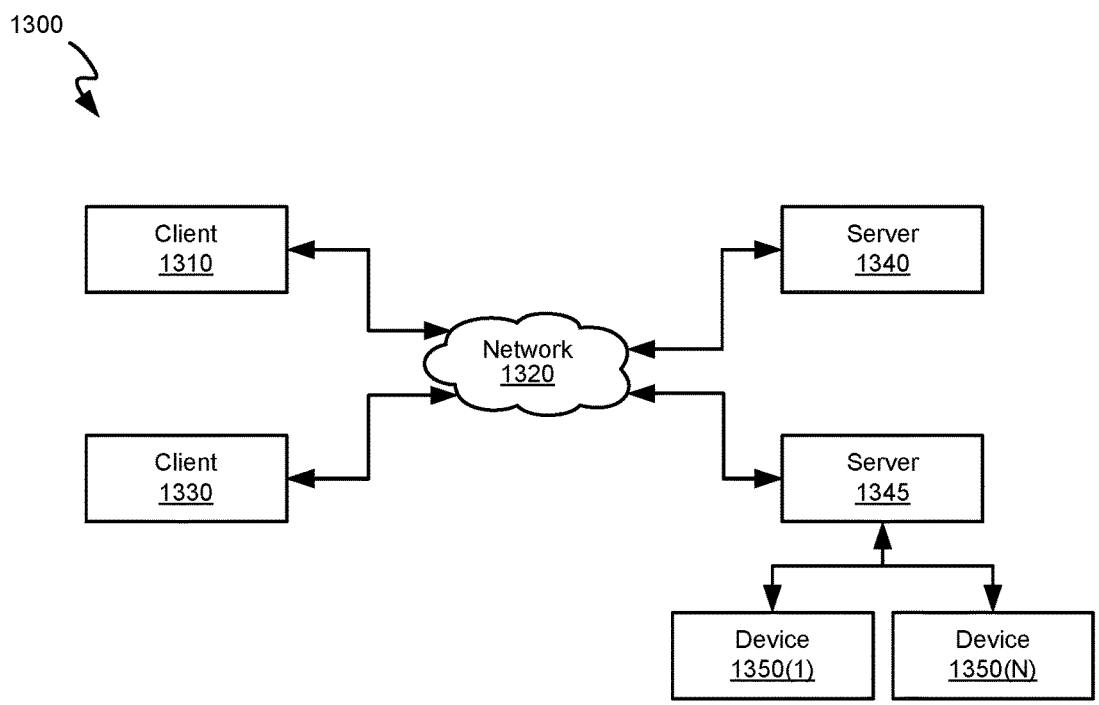

FIG. 13 is a block diagram of an example of a network architecture 1300 in which client systems 1310 and 1330, and servers 1340 and 1345, may be coupled to a network 1320. Network 1320 may be the same as or similar to network 1220. Client systems 1310 and 1330 generally represent any type or form of computing device or system, such as client devices (e.g., portable computers, smart phones, tablets, smart TVs, etc.).

Similarly, servers 1340 and 1345 generally represent computing devices or systems, such as application servers or database servers, configured to provide various database services and/or run certain software applications. Network 1320 generally represents any telecommunication or computer network including, for example, an intranet, a wide area network (WAN), a local area network (LAN), a personal area network (PAN), or the Internet.

With reference to computing system 1200 of FIG. 12, a communication interface, such as network adapter 1218, may be used to provide connectivity between each client system 1310 and 1330, and network 1320. Client systems 1310 and 1330 may be able to access information on server 1340 or 1345 using, for example, a Web browser, thin client application, or other client software. Such software may allow client systems 1310 and 1330 to access data hosted by server 1340, server 1345, or storage devices 1350(1)-(N). Although FIG. 13 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1340, server 1345, storage devices 1350(1)-(N), or any combination thereof. All or a portion of one or more of the example embodiments disclosed herein may also be encoded as a computer program, stored in server 1340, run by server 1345, and distributed to client systems 1310 and 1330 over network 1320.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

While the invention has been described with respect to a limited number of embodiments, those skilled in the art, having benefit of this disclosure, will appreciate that other embodiments may be devised that do not depart from the scope of the invention as disclosed herein.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

What is claimed is:

1. A system for intuitive search operation results using machine learning, the system comprising:
   a computer processor;
   a content comprehension engine executing on the computer processor and configured to:
      receive a content item search request identifying a requested content item, wherein the requested content item has insufficient platform velocity to be classified as a known content item;
      search a repository comprising a plurality of known content item models to determine that no known content item model comprising word vector collaborative filtering representations of user engagement with the requested content item is available to the content comprehension engine, wherein each of the plurality of known content item models has sufficient platform velocity to be classified as a known content item;
      generate, based on determining that no known content item model is available, an unknown content item model corresponding to the requested content item using a set of input embeddings of an unknown content embedding space generated based on content metadata and contextual content data associated with the requested content item;
      execute a deep neural machine learning model configured to project from the unknown content embedding space to a known content embedding space by:
         providing the set of input embeddings as inputs to the deep neural machine learning model;
         generating a set of output embeddings representing collaborative filtering representations of anticipated user engagement with the requested content item in the known content embedding space;
      perform a relevance search using the set of output embeddings to identify a subset of the plurality of known content item models based on a match strength of each of the plurality of known content item models with the content item search request, wherein each of the subset of the plurality of known content item models:
         is associated with at least one corresponding available content item, and
         includes word vector collaborative filtering representations of sufficient real user engagement with the associated at least one corresponding available content item in the known content embedding space; and
      provide a result set comprising the corresponding available content items of the identified subset of the plurality of known content item models in response to the content item search request, wherein the result set is displayed in a user interface element of a client device ordered according to the match strength of each of the subset of the plurality of known content item models.

2. The system of claim 1, wherein performing the relevance search further comprises:
   querying the repository comprising the plurality of known content item models;
   ranking, based on the output embeddings, the plurality of known content item models by relevance using a ranking criteria; and
   selecting the subset of the plurality of known content item models as being most relevant to the unavailable content item model based on the ranking.

3. The system of claim 2, wherein the ranking criteria comprises at least one selected from a group consisting of relevancy, temporal relevancy, similarity, popularity, value, promotional status, requesting account demographics, requesting account preferences, and requesting account past behavior.

4. The system of claim 1, wherein:
   generating the result set comprises including content tier information corresponding to each available content item in the result set for use in arranging a display of the available content items according to content tier.

5. The system of claim 1, wherein the content comprehension engine is further configured to:
   utilize the output embeddings to determine a set of content tiers most relevant to the unknown content item model, wherein providing the result set comprises including the set of content tiers for display.

6. The system of claim 1, wherein the result set of available content items comprises at least one content item of a different type from a type of the requested content item.

7. A method for intuitive search operation results using machine learning, the method comprising:
   receiving a content item search request identifying a requested content item, wherein the requested content item has insufficient platform velocity to be classified as a known content item;
   searching a repository comprising a plurality of known content item models to determine that no known content item model comprising word vector collaborative filtering representations of user engagement with the requested content item is available to the content comprehension engine, wherein each of the plurality of known content item models has sufficient platform velocity to be classified as a known content item;
   generating, by at least one computer processor and based on determining that no known content item model is available, an unknown content item model corresponding to the requested content item using a set of input embeddings of an unknown content embedding space generated based on content metadata and contextual content data associated with the requested content item;
   executing, by the at least one computer processor, a deep neural machine learning model configured to project from the unknown content embedding space to a known content embedding space by:
      providing the set of input embeddings as inputs to the deep neural machine learning model;
      generating a set of output embeddings representing collaborative filtering representations of anticipated user engagement with the requested content item in the known content embedding space;
   performing a relevance search using the set of output embeddings to identify a subset of the plurality of known content item models based on a match strength of each of the plurality of known content item models with the content item search request, wherein each of the subset of the plurality of known content item models:
      is associated with at least one corresponding available content item, and
      includes word vector collaborative filtering representations of sufficient real user engagement with the associated at least one corresponding available content item in the known content embedding space; and
   providing a result set comprising the corresponding available content items of the identified subset of the plurality of known content item models in response to the content item search request, wherein the result set is displayed in a user interface element of a client device ordered according to the match strength of each of the subset of the plurality of known content item models.

8. The method of claim 7, wherein performing the relevance search further comprises:
   querying the repository comprising the plurality of known content item models;
   ranking, based on the output embeddings, the plurality of known content item models by relevance using a ranking criteria; and
   selecting the subset of the plurality of known content item models as being most relevant to the unavailable content item model based on the ranking.

9. The method of claim 8, wherein the ranking criteria comprises at least one selected from a group consisting of relevancy, temporal relevancy, similarity, popularity, value, promotional status, requesting account demographics, requesting account preferences, and requesting account past behavior.

10. The method of claim 7, wherein:
   generating the result set comprises including content tier information corresponding to each available content item in the result set for use in arranging a display of the available content items according to content tier.

11. The method of claim 7, further comprising:
   utilizing the output embeddings to determine a set of content tiers most relevant to the unknown content item model, wherein providing the result set comprises including the set of content tiers for display.

12. The method of claim 7, wherein the result set of available content items comprises at least one content item of a different type from a type of the requested content item.

13. A non-transitory computer-readable storage medium comprising a plurality of instructions for intuitive search operation results using machine learning, the plurality of instructions configured to execute on at least one computer processor to enable the at least one computer processor to:
   receive a content item search request identifying a requested content item, wherein the requested content item has insufficient platform velocity to be classified as a known content item;
   search a repository comprising a plurality of known content item models to determine that no known content item model comprising word vector collaborative filtering representations of user engagement with the requested content item is available to the content comprehension engine, wherein each of the plurality of known content item models has sufficient platform velocity to be classified as a known content item;
   generate, based on determining that no known content item model is available, an unknown content item model corresponding to the requested content item using a set of input embeddings of a unknown content embedding space generated based on content metadata and contextual content data associated with the requested content item;

execute a deep neural machine learning model configured to project from the unknown content embedding space to a known content embedding space by:

providing the set of input embeddings as inputs to the deep neural machine learning model;

generating a set of output embeddings representing collaborative filtering representations of anticipated user engagement with the requested content item in the known content embedding space;

perform a relevance search using the set of output embeddings to identify a subset of the plurality of known content item models based on a match strength of each of the plurality of known content item models with the content item search request, wherein each of the subset of the plurality of known content item models:

is associated with at least one corresponding available content item, and includes word vector collaborative filtering representations of sufficient real user engagement with the associated at least one corresponding available content item in the known content embedding space; and provide a result set comprising the corresponding available content items of the identified subset of the plurality of known content item models in response to the content item search request, wherein the result set is displayed in a user interface element of a client device ordered according to the match strength of each of the subset of the plurality of known content item models.

14. The non-transitory computer-readable storage medium of claim 13, wherein performing the relevance search further comprises:

querying the repository comprising the plurality of known content item models;

ranking, based on the output embeddings, the plurality of known content item models by relevance using a ranking criteria; and selecting the subset of the plurality of known content item models as being most relevant to the unavailable content item model based on the ranking.

15. The system of claim 1, wherein content comprehension engine is further configured to:

identify, after providing the result set, real user engagement with the requested content item;

determine that the sufficient platform velocity of user engagement is met based on the real user engagement;

generate a set of warm-start characteristics using the real user engagement;

receive a second content item search request identifying the requested content item; and provide (i) the set of warm-start characteristics and (ii) the set of input embeddings as inputs to a second execution of the deep neural machine learning model to generate a second set of output embeddings, wherein the second set of output embeddings are used to perform a second relevance search.

16. The method of claim 7, further comprising:

identifying, after providing the result set, real user engagement with the requested content item;

determining that the sufficient platform velocity of user engagement is met based on the real user engagement;

generating a set of warm-start characteristics using the real user engagement;

receiving a second content item search request identifying the requested content item; and providing (i) the set of warm-start characteristics and (ii) the set of input embeddings as inputs to a second execution of the deep neural machine learning model to generate a second set of output embeddings, wherein the second set of output embeddings are used to perform a second relevance search.

17. The non-transitory computer-readable storage medium of claim 13, wherein the plurality of instructions are further configured to execute on the at least one computer processor to enable the at least one computer processor to:

identify, after providing the result set, real user engagement with the requested content item;

determine that the sufficient platform velocity of user engagement is met based on the real user engagement;

generate a set of warm-start characteristics using the real user engagement; and receive a second content item search request identifying the requested content item;

provide (i) the set of warm-start characteristics and (ii) the set of input embeddings as inputs to a second execution of the deep neural machine learning model to generate a second set of output embeddings, wherein the second set of output embeddings are used to perform a second relevance search.

\* \* \* \* \*